US012747349B2

(12) United States Patent
Kamiya

(10) Patent No.: US 12,747,349 B2

(45) **Date of Patent: *Sep. 29, 2026**

(54) CURING AGENT, METHOD OF PRODUCING CURING AGENT, AND CURABLE COMPOSITION

(71) Applicant: DEXERIALS CORPORATION, Tochigi (JP)

(72) Inventor: Kazunobu Kamiya, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 607 days.

This patent is subject to a terminal disclaimer.

(21) Appl. No.: 18/256,487

(22) PCT Filed: Dec. 7, 2021

(86) PCT No.: PCT/JP2021/044805

§ 371 (c)(1),
(2) Date: Jun. 8, 2023

(87) PCT Pub. No.: WO2022/138120

PCT Pub. Date: Jun. 30, 2022

(65) Prior Publication Data

US 2024/0026149 A1 Jan. 25, 2024

(30) Foreign Application Priority Data

Dec. 21, 2020 (JP) ................................ 2020-211163
Dec. 1, 2021 (JP) ................................ 2021-195125

(51) Int. Cl.

*C08L 63/00* (2006.01)
*C08G 59/40* (2006.01)

(Continued)

(52) U.S. Cl.

CPC .......... *C08L 63/00* (2013.01); *C08G 59/4007* (2013.01); *C08G 59/70* (2013.01); *C08K 5/541* (2013.01); *C08K 5/5419* (2013.01)

(58) Field of Classification Search

CPC .... C08G 59/24; C08G 59/40; C08G 59/4007; C08G 59/70; C08K 5/541; C08K 5/5415; C08K 5/5419; C08L 63/00

See application file for complete search history.

(56) References Cited

U.S. PATENT DOCUMENTS 5,187,012 A 2/1993 Takahashi et al.
6,469,113 B1 10/2002 Lee et al.

(Continued)

FOREIGN PATENT DOCUMENTS

JP S60-026024 2/1985
JP S62-019801 1/1987

(Continued)

OTHER PUBLICATIONS

English-language machine translation of JP 2015-232119 A. (Year: 2015).*

(Continued)

*Primary Examiner* — James C Goloboy

(74) *Attorney, Agent, or Firm* — IPUSA, PLLC

(57) ABSTRACT

Provided is a curing agent that includes a curing catalyst, and an aliphatic cyclic polyolefin resin disposed on a surface of the curing catalyst. The curing catalyst includes porous polyurea particles each bearing an aluminum chelating compound, or a water-insoluble catalyst powder having a solubility of 5% by mass or less relative to water.

10 Claims, 10 Drawing Sheets

(51) Int. Cl.

| | |
|---|---|
| ***C08G 59/70*** | (2006.01) |
| ***C08K 5/541*** | (2006.01) |
| ***C08K 5/5419*** | (2006.01) |

(56) References Cited

U.S. PATENT DOCUMENTS

| | | | |
|---|---|---|---|
| 2002/0151627 A1 | 10/2002 | Matsushima | |
| 2004/0229157 A1 | 11/2004 | Rhodes et al. | |
| 2006/0050388 A1 | 3/2006 | Kim et al. | |
| 2007/0010636 A1 | 1/2007 | Kamiya et al. | |
| 2017/0253694 A1 | 9/2017 | Kamiya | |
| 2018/0371155 A1 | 12/2018 | Kamiya | |
| 2019/0177533 A1 | 6/2019 | Kamiya | |
| 2019/0194454 A1* | 6/2019 | Nishio | C08K 5/5419 |
| 2022/0098357 A1 | 3/2022 | Kamiya | |
| 2024/0026149 A1 | 1/2024 | Kamiya | |

FOREIGN PATENT DOCUMENTS

| | | |
|---|---|---|
| JP | H01-240517 | 9/1989 |
| JP | H07-196736 | 8/1995 |
| JP | H10-007732 | 1/1998 |
| JP | 2002-504184 | 2/2002 |
| JP | 2002-212537 | 7/2002 |
| JP | 2003-159767 | 6/2003 |
| JP | 2004-309979 | 11/2004 |
| JP | 2006-070051 | 3/2006 |
| JP | 2009-203477 | 9/2009 |
| JP | 2009-221465 | 10/2009 |
| JP | 2011-012168 | 1/2011 |
| JP | 2012-140574 | 7/2012 |
| JP | 2015-232119 | 12/2015 |
| JP | 2015232119 A * | 12/2015 |
| JP | 2017-222782 | 12/2017 |
| JP | 6670688 | 3/2020 |
| JP | 2020-139169 | 9/2020 |
| JP | 6875999 | 5/2021 |
| WO | 2004/070463 | 8/2004 |
| WO | 2004/092791 | 10/2004 |
| WO | 2016/024471 | 2/2016 |
| WO | 2016/039193 | 3/2016 |
| WO | 2017/104244 | 6/2017 |
| WO | 2017/217275 | 12/2017 |
| WO | 2020/166398 | 8/2020 |
| WO | 2022/138120 | 6/2022 |

OTHER PUBLICATIONS

H. Gu, C. Xu, L.-T. Weng, B. Xu, "Solventless Polymerization: Spatial Migration of a Catalyst to Form Polymeric Thin Films in Microchannels", J. Am. Chem. Soc., 2003, 125, 31, 9256-9257 (Year: 2003).*

Supporting information for Gu publications (Year: 2003).*

International Search Report for PCT/JP2021/044805 mailed on Mar. 1, 2022.

International Search Report for PCT/JP2022/041484 mailed on Jan. 31, 2023.

* cited by examiner

CURING AGENT, METHOD OF PRODUCING CURING AGENT, AND CURABLE COMPOSITION

TECHNICAL FIELD

The present invention relates to a curing agent, a method of producing the curing agent, and a curable composition.

BACKGROUND ART

Aluminum chelating compounds have been known as curing catalysts that generate cationic species as being mixed with a silanol compound and cure an epoxy resin at room temperature. However, it was difficult to bring use of aluminum chelating compounds in practice because aluminum chelating compounds lack sufficient latency as curing catalysts.

To solve the above-described problem, the present inventors diligently conducted research. Based on the research, the present inventor has proposed a curing catalyst that can cure an epoxy resin at certain temperatures to achieve low-temperature high-speed curing as the aluminum chelating compound is encapsulated in microcapsules of a polyurea porous resin obtained by interfacial polycondensation of a polyfunctional isocyanate compound, and can achieve storage stability in a one-part epoxy resin composition (see, for example, PTL 1 to PTL 3).

These proposed curing catalysts however have the following problem. The aluminum chelating compound reacts with water to change its composition. As the aluminum chelating compound is encapsulated through interfacial polycondensation of a polyfunctional isocyanate compound in water, the aluminum chelating compound decomposes due to hydrolysis to lower activity of the aluminum chelating compound.

To solve the above-described problem, for example, the following method of producing an aluminum chelate-based latent curing agent is proposed. That is, the method where a particulate curing agent produced from an aluminum chelating compound, a silanol compound, and a polyfunctional isocyanate compound is loaded with an aluminum chelating compound in an organic solvent, followed by performing a surface treatment with an epoxy alkoxysilane coupling agent (see, for example, PTL 4). However, the polymer coating film formed of the epoxy alkoxysilane coupling agent is a coating film formed by polymerization of a monofunctional epoxy compound, thus such a coating film does not satisfactory achieve adequate storage stability of a one-part curable composition, particularly a polar solvent-blended composition, at room temperature or lower.

Moreover, a latent curing agent including porous particles and a coating film on a surface of each of the porous particles is proposed, where the porous particles are formed of a polyurea resin and bear an aluminum chelate and an aryl silanol compound, and the coating film is formed of a cured product of an alicyclic epoxy resin (see, for example, PTL 5). The proposed latent curing agent aims at achieving both low-temperature curing and prevention of a viscosity increase of a thermoset epoxy resin composition during storage of a thermoset epoxy resin composition, but storage stability of a one-part epoxy resin composition, particularly a polar solvent-blended composition, is not satisfactory adequate because the coating film formed of the cured product of the alicyclic epoxy resin includes a polar ester group in the molecular structure thereof.

Meanwhile, capsules in each of which a water-soluble curing agent is encapsulated are proposed, where, in each capsule, the water-soluble curing agent is used as a core, and an inner layer of a shell includes a water-soluble polymer and an outer layer of the shell includes a hydrophobic polymer (see, for example, PTL 6). In Example 12 of the above proposal, an aliphatic cyclic polyolefin resin is used as the polymer of the outer layer.

CITATION LIST

Patent Literature

PTL 1: Japanese Patent (JP-B) No. 4381255
PTL 2: Japanese Patent (JP-B) No. 5417982
PTL 3: Japanese Patent (JP-B) No. 5458596
PTL 4: International Publication No. WO 2017/104244
PTL 5: Japanese Patent Application Laid-Open (JP-A) No. 2017-222782
PTL 6: Japanese Patent Application Laid-Open (JP-A) No. 2015-232119

SUMMARY OF INVENTION

Technical Problem

According to PTL 6, however, the materials that can be encapsulated are limited to water-soluble curing agents, such as imidazole compounds, amine compounds, and phenol-based compounds, thus highly active curing catalysts that react with water and water-insoluble curing catalysts cannot be used. Since the invention disclosed in PTL 6 uses a water-soluble curing agent as a core, moreover, the structure of the invention disclosed in PTL 6 is clearly different from the structure of the present invention in that a polymer is added to solidify a core, a shell is composed of an inner layer and an outer layer, and the like. Moreover, the invention disclosed in PTL 6 aims at a rapid progression of a curing reaction during curing to form a cured product including less voids. Therefore, the object of PTL 6 differs from the object of the present invention, which is to realize curing at a temperature lower than curing temperatures known in the related art, and to significantly improve storage stability of a one-part curable composition.

The present invention aims to solve the above-described various problems existing in the related art, and achieving the following object. Specifically, an object of the present invention is to provide a curing agent capable of curing at a temperature lower than curing temperatures known in the related art and significantly improving storage stability of a one-part curable composition, as well as providing a method of producing the curing agent and a curable composition including the curing agent.

Solution to Problem

Means for solving the above-described problems are as follows.

<1> A curing agent including:

a curing catalyst; and an aliphatic cyclic polyolefin resin disposed on a surface of the curing catalyst, wherein the curing catalyst includes porous polyurea particles each bearing an aluminum chelating compound, or a water-insoluble catalyst powder having a solubility of 5% by mass or less relative to water.

<2> The curing agent according to <1>, wherein the water-insoluble catalyst powder includes a curable resin.

<3> The curing agent according to <1> or <2>, wherein the curing agent has a volume-based mean particle diameter of 10 μm or less.

<4> The curing agent according to any one of <1> to <3>, wherein the water-insoluble catalyst powder is an amine adduct compound.

<5> The curing agent according to <4>, wherein the amine adduct compound is an imidazole adduct or an aliphatic amine adduct.

<6> The curing agent according to any one of <1> to <5>, wherein the aliphatic cyclic polyolefin resin has a glass transition temperature of 140° C. or lower.

<7> The curing agent according to any one of <1> to <6>, wherein the aliphatic cyclic polyolefin resin is at least one of a cycloolefin copolymer (COC) and a cycloolefin homopolymer (COP).

<8> A curing agent including:

a first curing agent including an aliphatic cyclic polyolefin resin, wherein a carbon content C1 (atom %) of the first curing agent measured by X-ray photoelectron spectroscopy (XPS) and a carbon content C2 (atom %) of a second curing agent measured by XSP satisfy the following formula:

$$[(C1-C2)/C2]\times 100\geq 1\%,$$

where the second curing agent is a curing agent obtained by removing the aliphatic cyclic polyolefin resin from the first curing agent.

<9> A curing agent including:

a first curing agent including an aliphatic cyclic polyolefin resin, wherein an exothermic onset temperature ST1 (° C.) and an exothermic peak temperature PT1 (° C.) of a first curable composition measured by differential scanning calorimetry (DSC) and an exothermic onset temperature ST2 (° C.) and an exothermic peak temperature PT2 (° C.) of a second curable composition measured by DSC satisfy the following formulae:

$$ST1-ST2\geq 4^\circ\text{ C.}$$

$$PT1-PT2\leq 5^\circ\text{ C.},$$

where the first curable composition includes an epoxy resin and the first curing agent, the second curable composition includes an epoxy resin and a second curing agent, and the second curing agent is a curing agent obtained by removing the aliphatic cyclic polyolefin resin from the first curing agent.

<10> A method of producing a curing agent, the method including:

dispersing, in a solution including an aliphatic cyclic polyolefin resin in an amount of 1% by mass or less and an organic solvent, porous polyurea particles each bearing an aluminum chelating compound or a water-insoluble catalyst powder having a solubility of 5% by mass or less relative to water, to prepare a dispersion liquid, and spray-drying the dispersion liquid.

<11> A curable composition including:

the curing agent according to any one of <1> to <9>; and an epoxy resin.

<12> The curable composition according to <11>, wherein the epoxy resin is at least one epoxy resin selected from the group consisting of an alicyclic epoxy resin, a glycidyl ether-based epoxy resin, a glycidyl ester-based epoxy resin, and a solvent-containing epoxy resin in which any of the glycidyl ether-based epoxy resin or the glycidyl ester-based epoxy resin is dissolved in a solvent.

<13> The curable composition according to <11> or <12>, further including:

a silanol compound.

Advantageous Effects of Invention

The present invention can solve the above-described various problems existing in the related art, achieve the above-described object, and provide a curing agent capable of curing at a temperature lower than curing temperatures known in the related art and significantly improving storage stability of a one-part curable composition, as well as providing a method of producing the curing agent and a curable composition including the curing agent.

DESCRIPTION OF EMBODIMENTS (Curing Agent)

Figure 1:
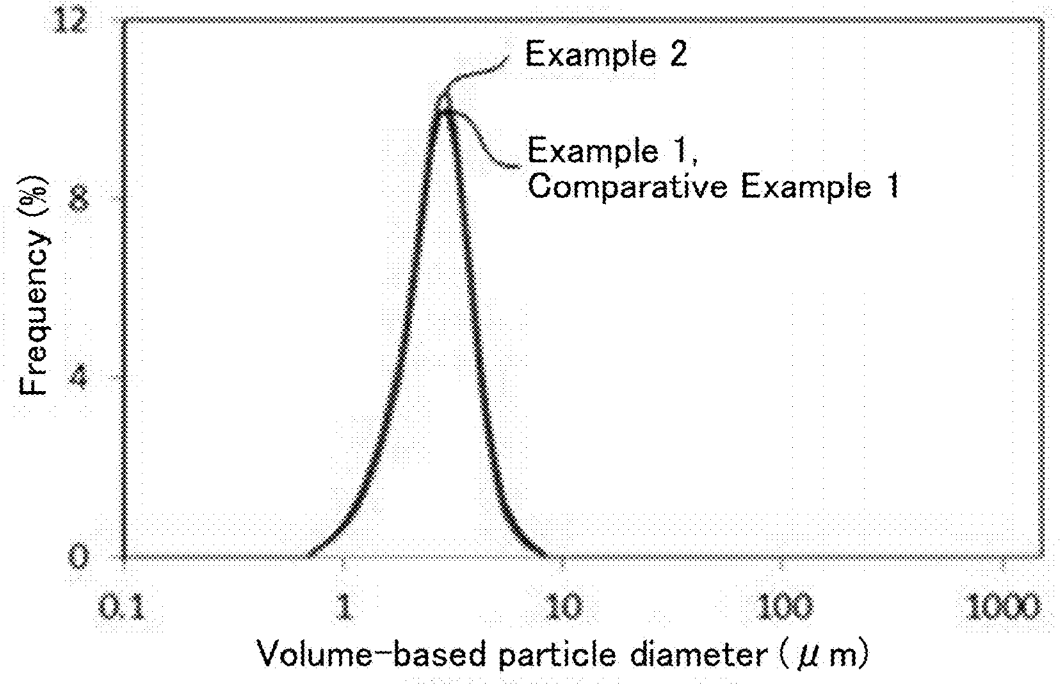
FIG. 1 is a graph depicting volume-based particle size distributions of the curing agents of Example 1, Example 2, and Comparative Example 1, respectively.

The curing agent of the present invention includes a curing catalyst and an aliphatic cyclic polyolefin resin disposed on a surface of the curing catalyst, where the curing catalyst includes porous polyurea particles each bearing an aluminum chelating compound or a water-insoluble catalyst powder having a solubility of 5% by mass or less relative to water. The curing agent may further include other components, as necessary.

In the present invention, the aliphatic cyclic polyolefin resin is disposed on a surface of the curing catalyst. A manner of disposing the aliphatic cyclic polyolefin resin on the surface of the curing catalyst is not particularly limited, provided that the aliphatic cyclic polyolefin resin is present on the surface of the curing catalyst of any form. The aliphatic cyclic polyolefin resin is disposed preferably as a coating film formed of the aliphatic cyclic polyolefin resin. The aliphatic cyclic polyolefin resin may be also held on the surface of the curing catalyst via any arbitrary interaction, such as deposition, adhesion, adsorption, van der Waals forces, and the like.

When a coating film of the aliphatic cyclic polyolefin resin is formed on the surface of the curing catalyst, the coating film may be formed on at least part of the surface of the curing catalyst, or may be formed on the entire surface of the curing catalyst. Moreover, the coating film may be formed as a continuous film. Alternatively, the coating film may partially include a noncontinuous film.

Examples of a method of analyzing the presence of the aliphatic cyclic polyolefin resin on a surface of the curing catalyst include a method where the aliphatic cyclic polyolefin resin of the curing catalyst is dissolved with a solvent capable of selectively dissolving an aliphatic cyclic polyolefin resin, and the aliphatic cyclic polyolefin resin in the resulting solution is analyzed by a thermogravimetry differential thermal analyzer (TG/DTA), and the like. Examples of the solvent capable of selectively dissolving the aliphatic cyclic polyolefin resin include cyclohexane, chlorobenzene, and the like.

In the present invention, a carbon content C1 (atom %) of a first curing agent measured by X-ray photoelectron spectroscopy (XPS) and a carbon content C2 (atom %) of a second curing agent measured by XSP satisfy the following formula:

$$[(C1-C2)/C2]\times 100\geq 1\%,$$

where the first curing agent includes an aliphatic cyclic polyolefin resin, and the second curing agent is a curing agent obtained by removing the aliphatic cyclic polyolefin resin from the first curing agent.

Since the following formula: $[(C1-C2)/C2]\times 100\geq 1\%$ is satisfied, the presence of the aliphatic cyclic polyolefin resin on the surface of the curing catalyst is confirmed. Therefore, curing at a temperature lower than curing temperatures known in the related art is achieved, and an effect of significantly improving storage stability of a one-part curable composition is obtained.

Examples of a method of removing the aliphatic cyclic polyolefin resin from the first curing agent include a method where the aliphatic cyclic polyolefin resin of the curing catalyst is dissolved with a solvent that selectively dissolves an aliphatic cyclic polyolefin resin (e.g., cyclohexane, chlorobenzene, and the like), and the like.

In the present invention, moreover, an exothermic onset temperature ST1 (° C.) and an exothermic peak temperature PT1 (° C.) of a first curable composition measured by differential scanning calorimetry (DSC) and an exothermic onset temperature ST2 (° C.) and an exothermic peak temperature PT2 (° C.) of a second curable composition measured DSC satisfy the following formulae:

$$ST1-ST2\geq 4^\circ\ C.$$

$$PT1-PT2\leq 5^\circ\ C.,$$

where the first curable composition includes an epoxy resin and a first curing agent, the first curing agent includes an aliphatic cyclic polyolefin resin, the second curable composition including an epoxy resin and a second curing agent, and the second curing agent is a curing agent obtained by removing the aliphatic cyclic polyolefin resin from the first curing agent. Therefore, curing at a temperature lower than curing temperatures known in the related art is achieved, and an effect of significantly improving storage stability of a one-part curable composition is obtained.

Examples of a method of removing the aliphatic cyclic polyolefin resin from the first curing agent include a method where the aliphatic cyclic polyolefin resin of the curing catalyst is dissolved with a solvent that selectively dissolves an aliphatic cyclic polyolefin resin (e.g., cyclohexane, chlorobenzene, and the like), and the like.

<Curing Catalyst>

The curing catalyst is either porous polyurea particles each bearing an aluminum chelating compound or a water-insoluble catalyst powder having a solubility of 5% by mass or less relative to water.

<<Porous Polyurea Particles Each Bearing Aluminum Chelating Compound>>

The porous particles are each composed of a polyurea resin.

Each of the porous particles bears an aluminum chelating compound.

For example, the aluminum chelating compound is preferably borne inside the pores of each porous particle. In other words, the aluminum chelating compound is incorporated into and borne in fine pores present inside a matrix of each porous particle composed of the polyurea resin.

—Polyurea Resin—

The polyurea resin is a resin including urea bonds in the molecular structure of the resin.

The polyurea resin constituting the porous particles is obtained, for example, by polymerizing a polyfunctional isocyanate compound in an emulsion. The details are described later. The polyurea resin may include bonds derived from isocyanate groups, but not urea bonds, such as urethane bonds, in the molecular structure of the resin. When the resin includes urethane bonds, such a resin may be referred to as a polyurethane resin.

—Aluminum Chelating Compound—

Examples of the aluminum chelating compound include a complex compound represented by General Formula (1) below, in which three β-keto enolate anions are coordinated in aluminum. An alkoxy group is not directly bonded to the aluminum. If the alkoxy group is directly bonded to the aluminum, hydrolysis is easily caused, which is not suitable for emulsification.

[Chem. 1]

General Formula (1)

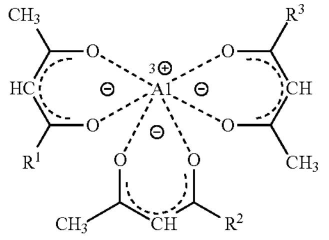

In General Formula (1), $R^1$, $R^2$, and $R^3$ are each independently an alkyl group or an alkoxy group.

Examples of the alkyl group include a methyl group, an ethyl group, and the like.

Examples of the alkoxy group include a methoxy group, an ethoxy group, an oleyloxy group, and the like.

Examples of the complex compound represented by General Formula (1) include aluminum tris(acetylacetonate), aluminum tris(ethylacetoacetate), aluminum monoacetylacetonate bis(ethylacetoacetate), aluminum monoacetylacetonate bis(oleylacetoacetate), and the like. The above-listed examples may be used alone or in combination.

As the aluminum chelating compound comes into contact with water, the aluminum chelating compound undergoes exothermic decomposition. Therefore, the aluminum chelating compound is a compound that cannot be dissolved in water. For this reason, porous polyurea particles each bearing an aluminum chelating compound are a curing catalyst that is prohibited from being in contact with water.

The amount of the aluminum chelating compound in the porous particles is not particularly limited, and may be appropriately selected in accordance with the intended purpose.

The average pore diameter of the porous particles is not particularly limited, and may be appropriately selected in accordance with the intended purpose. The average pore diameter is preferably 1 nm or greater and 300 nm or less, more preferably 5 nm or greater and 150 nm or less.

The volume-based mean particle diameter of the porous particles is not particularly limited, and may be appropriately selected in accordance with the intended purpose. The volume-based mean particle diameter is preferably 10 μm or less, more preferably 1 μm or greater and 10 μm or less, and particularly preferably 1 μm or greater and 5 μm or less.

[Method of Producing Porous Polyurea Particles Each Bearing Aluminum Chelating Compound]

The method of producing the porous polyurea particles bearing each the aluminum chelating compound includes a porous particle production step, and may further include other steps as necessary.

—Porous Particle Production Step—

The porous particle production step includes at least an emulsion production process and a polymerization process, preferably further includes a highly-loaded impregnation process, and may further include other processes, as necessary.

—Emulsion Production Process—

The emulsion production process is not particularly limited, provided that a liquid obtained by mixing an aluminum chelating compound, a polyfunctional isocyanate compound, and preferably an organic solvent is emulsified to obtain an emulsion. The emulsion production process may be appropriately selected in accordance with the intended purpose. For example, the emulsion production process may be carried out by a homogenizer.

Examples of the aluminum chelating compound include the aluminum chelating compounds listed in the description of the curing agent of the present invention.

The size of oil droplets in the emulsion is not particularly limited, and may be appropriately selected in accordance with the intended purpose. The size of the oil droplets is preferably 0.5 μm or greater and 100 μm or less.

—Polyfunctional Isocyanate Compound—

The polyfunctional isocyanate compound is a compound including 2 or more isocyanate groups per molecule, preferably 3 or more isocyanate groups per molecule. More preferred examples of the trifunctional isocyanate compound include: TMP adducts represented by General Formula (2) below, where 1 mol of trimethylol propane is reacted with 3 mol of a diisocyanate compound; isocyanurates represented by General Formula (3) below, where 3 mol of a diisocyanate compound is reacted through self-condensation; and biurets represented by General Formula (4) below, where within 3 mol of a diisocyanate compound, diisocyanate urea obtained from 2 mol of the diisocyanate compound is reacted with the remaining 1 mol of diisocyanate via condensation.

[Chem. 2]

General Formula (2)

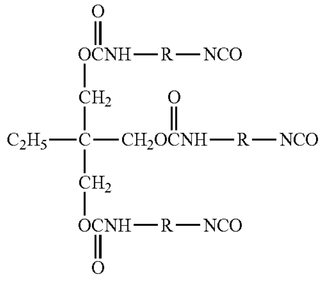

General Formula (3)

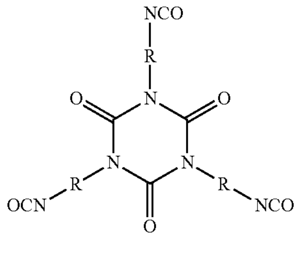

General Formula (4)

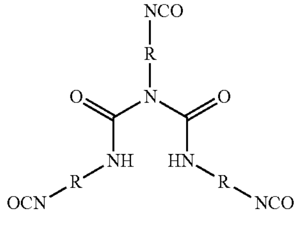

In General Formulae (2) to (4) above, the substituent R is a segment of a diisocyanate compound from which an isocyanate group is removed. Specific examples of the diisocyanate compound include toluene 2,4-diisocyanate, toluene 2,6-diisocyanate, m-xylene diisocyanate, hexamethylene diisocyanate, hexahydro-m-xylylene diisocyanate, isophorone diisocyanate, methylene diphenyl-4,4'-diisocyanate, and the like. The above-listed examples may be used alone or in combination.

The blending ratio between the aluminum chelating compound and the polyfunctional isocyanate compound is not particularly limited, and may be appropriately selected in accordance with the intended purpose. When the amount of the aluminum chelating compound is too small, curability of a cationic curable compound to be cured may become low. When the amount of the aluminum chelating compound is too large, latency of a resulting curing agent may become low. In view of the above-described points, the amount of the aluminum chelating compound is preferably 10 parts by mass or greater and 500 parts by mass or less, more preferably 10 parts by mass or greater and 300 parts by mass or less, relative to 100 parts by mass of the polyfunctional isocyanate compound.

—Organic Solvent—

The organic solvent is not particularly limited, and may be appropriately selected in accordance with the intended purpose.

The organic solvent is preferably a volatile organic solvent. The organic solvent is preferably a good solvent for both the aluminum chelating compound and the polyfunctional isocyanate compound (the solubility of the both being preferably 0.1 g/mL (organic solvent) or greater), is preferably substantially insoluble to water (the solubility of water being 0.5 g/mL (organic solvent) or less), and preferably has a boiling point of 100° C. or lower at atmospheric pressure. Specific examples of the volatile organic solvent include alcohols, acetic acid esters, ketones, and the like. Among the above-listed examples, ethyl acetate is preferred because of high polarity, a low boiling point, and low water-solubility.

The amount of the organic solvent to be used is not particularly limited, and may be appropriately selected in accordance with the intended purpose.

—Polymerization Process—

The polymerization process is not particularly limited, provided that the polymerization process is a process of polymerizing the polyfunctional isocyanate compound in the emulsion to form porous particles. The polymerization process may be appropriately selected in accordance with the intended purpose.

Each of the porous particles bears the aluminum chelating compound.

In the polymerization process, part of isocyanate groups of the polyfunctional isocyanate compound are transformed into amino groups through hydrolysis, and the amino groups and isocyanate groups of the polyfunctional isocyanate compound are reacted to generate urea bonds to form a polyurea resin. In a case where the polyfunctional isocyanate compound includes a urethane bond, a resulting polyurea resin also includes a urethane bond. Therefore, the generated polyurea resin may be also referred to as a polyurethane resin.

The duration of the polymerization in the polymerization process is not particularly limited, and may be appropriately selected in accordance with the intended purpose. The duration of the polymerization is preferably 1 hour or longer and 30 hours or shorter, more preferably 2 hours or longer and 10 hours or shorter.

The polymerization temperature in the polymerization process is not particularly limited, and may be appropriately selected in accordance with the intended purpose. The polymerization temperature is preferably 30° C. or higher and 90° C. or lower, and more preferably 50° C. or higher and 80° C. or lower.

After the polymerization process, a highly-loaded impregnation process with the aluminum chelating compound may be performed to increase the amount of the aluminum chelating compound borne with the porous particles.

—Highly-Loaded Impregnation Process—

The highly-loaded impregnation process is not particularly limited, provided that the porous particles obtained by the polymerization process are additionally loaded with an aluminum chelating compound. The highly-loaded impregnation process may be appropriately selected in accordance with the intended purpose. Examples of the highly-loaded impregnation process include a method where the porous particles are dipped in a solution prepared by dissolving an aluminum chelating compound in an organic solvent, followed by removing the organic solvent from the solution, and the like.

As the highly-loaded impregnation process is carried out, the amount of the aluminum chelating compound borne with the porous particles is increased. The porous particles with which the aluminum chelating compound is additionally loaded are optionally separated by filtration, washed, and dried, followed by crushing into primary particles using any of crushers known in the related art.

The aluminum chelating compound that is additionally loaded during the highly-loaded impregnation process may be identical to or different from the aluminum chelating compound added to the liquid that will be formed into the emulsion. Since water is not used in the highly-loaded impregnation process, for example, the aluminum chelating compound used in the highly-loaded impregnation process may be an aluminum chelating compound in which an alkoxy group is bonded to aluminum. Examples of such an aluminum chelating compound include diisopropoxyaluminum monooleyl acetoacetate, monoisopropoxyaluminum bis (oleyl acetoacetate), monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, monoisopropoxyaluminum mono-N-lauloyl-β-alanate monolaurylacetoacetate, and the like. The above-listed examples may be used alone or in combination.

The organic solvent is not particularly limited, and may be appropriately selected in accordance with the intended purpose. Examples of the organic solvent include the organic solvents listed in the description of the emulsion production process, and the like. The preferred embodiments of the organic solvent are also the same as in the description of the emulsion production process.

A method of removing the organic solvent from the solution is not particularly limited, and may be appropriately selected in accordance with the intended purpose. Examples of the method include: a method where the solution is heated to a temperature equal to or higher than a boiling point of the organic solvent; a method where the solution is decompressed; and the like.

The amount of the aluminum chelating compound in the solution, which is prepared by dissolving the aluminum chelating compound in the organic solvent, is not particularly limited, and may be appropriately selected in accordance with the intended purpose. The amount of the aluminum chelating compound is preferably 10% by mass or greater and 80% by mass or less, more preferably 10% by mass or greater and 50% by mass or less.

<<Water-Insoluble Catalyst Powder>>

The water-insoluble catalyst powder has low water solubility, or is insoluble to water. The water-insoluble catalyst powder has a solubility of 5% by mass or less relative to water.

The solubility of the water-insoluble catalyst powder relative to water can be determined by adding 5 g of the water-insoluble catalyst powder to 95 g of water of 25° C., stirring the resulting mixture for 24 hours by a stirrer, filtering the resulting mixture with a filter having an average pore diameter of 0.1 μm, measuring the resulting filtrate by a thermogravimetry differential thermal analyzer (TG/DTA), and measuring a weight reduction unique to the water-insoluble catalyst powder in the high temperature region of 200° C. or higher.

The water-insoluble catalyst powder preferably includes a curable resin. For example, the curable resin preferably includes a (meth)acrylic compound and an epoxy compound.

Examples of the (meth)acrylic compound include a (meth)acrylate compound obtained by reacting (meth) acrylic acid with a hydrogen group-containing compound, epoxy (meth)acrylate obtained by reacting (meth)acrylic acid with an epoxy compound, urethane (meth)acrylate obtained by reacting an isocyanate compound with a hydroxyl group-containing (meth)acrylic acid derivative, and the like. The above-listed examples may be used alone or in combination.

Examples of the epoxy compound include bisphenol A epoxy resins, bisphenol F epoxy resins, bisphenol S epoxy resins, 2,2'-diallylbisphenol A epoxy resins, hydrogenated bisphenol epoxy resins, propylene oxide-added bisphenol A epoxy resins, resorcinol-based epoxy resins, biphenyl-based epoxy resins, sulfide-based epoxy resins, diphenyl ether-based epoxy resins, dicyclopentadiene-based epoxy resins, naphthalene-based epoxy resins, phenol novolac-based epoxy resins, ortho-cresol novolac-based epoxy resins, dicyclopentadiene novolac-based epoxy resins, diphenyl novolac-based epoxy resins, naphthalene phenol novolac-based epoxy resins, glycidyl amine-based epoxy resins, alkyl polyol-based epoxy resins, rubber-modified epoxy resins, glycidyl ester compounds, and the like. The above-listed examples may be used alone or in combination.

The water-insoluble catalyst powder is in the form of particles. The volume-based mean particle diameter of the water-insoluble catalyst powder is not particularly limited, and may be appropriately selected in accordance with the intended purpose. The volume-based mean particle diameter is preferably 10 μm or less, more preferably 1 μm or greater and 10 μm or less, and particularly preferably 1 μm or greater and 5 μm or less.

The water-insoluble catalyst powder is preferably an amine adduct compound.

Examples of the amine adduct compound include adducts between an imidazole compound and an epoxy compound, adducts between an aliphatic amine compound and an epoxy compound, and the like.

Examples of the commercially available amine adduct compound include: AJICURE PN-23, AJICURE PN-23J, AJICURE PN-H, AJICURE PN-31, AJICURE PN-31J, AJICURE PN-40, AJICURE PN-40J, AJICURE PN-50, AJICURE PN-F, AJICURE MY-24, and AJICURE MY-H (all manufactured by Ajinomoto Fine-Techno Co., Inc.); P-0505 (manufactured by SHIKOKU CHEMICALS CORPORATION); P-200 (manufactured by Mitsubishi Chemical Corporation); ADEKA HARDENER EH-5001P, ADEKA HARDENER EH-5057PK, ADEKA HARDENER EH-5030S, and ADEKA HARDENER EH-5011S (all manufactured by ADEKA CORPORATION); Fujicure FXR-1036, Fujicure FXR-1020, and Fujicure FXR-1081 (manufactured by T&K TOKA CO., LTD.); and the like. The above-listed examples may be used alone or in combination.

<Aliphatic Cyclic Polyolefin Resin>

The aliphatic cyclic polyolefin resin is a polymer resin having an aliphatic cyclic olefin structure.

Examples of the aliphatic cyclic polyolefin resin include (1) norbornene-based polymers, (2) monocyclic olefin polymers, (3) cyclic conjugated diene polymers, (4) vinyl alicyclic hydrocarbon polymers, hydrides of any of (1) to (4), and the like.

The polymers preferred in the present invention are addition (co)polymer cyclic polyolefin including at least one repeating unit represented by General Formula (II) below, and optionally addition (co)polymer cyclic polyolefin including at least one repeating unit represented by General Formula (I) below. In addition, ring-opening (co)polymers each including at least one repeating unit represented by General Formula (III) or (IV) below may be also suitably used. Among the above-listed examples, at least one of cycloolefin copolymers (e.g., cycloolefin copolymer (COC) resins, ethylene-norbornene copolymers, and the like), and cycloolefin homopolymers (e.g., cycloolefin polymer (COP) resins, and the like) is preferred.

[Chem. 3]

General Formula (I)

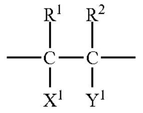

[Chem. 4]

General Formula (II)

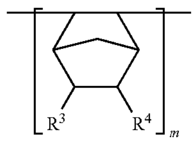

[Chem. 5]

General Formula (III)

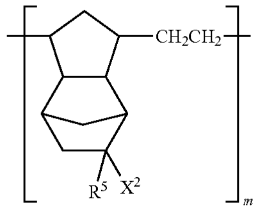

[Chem. 6]

General Formula (IV)

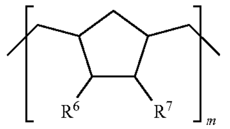

In General Formulae (I) to (IV), m is an integer of from 0 to 10.

$R^1$ to $R^7$ are each a hydrogen atom or a C1-C10 hydrocarbon group.

$X^1$ to $X^2$, and $Y_1$ are each a hydrogen atom, a C1-C10 hydrocarbon group, a halogen atom, a C1-C10 hydrocarbon group substituted with a halogen atom, $—(CH_2)_nCOOR^8$, $—(CH_2)_nOCOR^9$, $—(CH_2)_nNCO$, $—(CH_2)_nNO_2$, $—(CH_2)_nCN$, $—(CH_2)_nCONR^{10}R^{11}$, $—(CH_2)_nNR^{10}R^{11}$, $—(CH_2)_nOZ$, $—(CH_2)_nW$, or $(—CO)_2O$ or $(—CO)_2NR^{12}$ composed of a combination of $X^1$ and $Y^1$ or a combination of $X^2$ and $Y^1$. Note that, $R^8$, $R^9$, $R^{10}$, $R^{11}$, and $R^{12}$ are each a hydrogen atom or a C1-C20 hydrocarbon group; Z is a C1-C10 hydrocarbon group or a C1-C10 hydrocarbon group substituted with halogen; and W is $SiR^{13}{}_pD_{3-p}$ (where $R^{13}$ is a C1-C10 hydrocarbon group, D is a halogen atom, $—OCOR^{14}$, or $OR^{14}$, and p is an integer of from 0 to 3). $R^{14}$ is a hydrogen atom or a C1-C10 hydrocarbon group, and n is an integer of from 0 to 10.

As disclosed in JP-A No. 01-240517, 07-196736, 60-26024, 62-19801, 2003-1159767, or 2004-309979, the norbornene-based polymer hydride is synthesized by polymerizing a polycyclic unsaturated compound through addition polymerization or ring-opening metathesis polymerization, followed by performing hydrogenation.

In the norbornene-based polymer, $R^5$ to $R^7$ are each preferably a hydrogen atom or $—CH_3$; $X^2$ is preferably a hydrogen atom, Cl, or $—COOCH_3$; and other groups are appropriately selected. The norbornene-based resin is commercially available from JSR Corporation under the product name of Arton, and is also commercially available from Zeon Corporation under the product names of Zeonor and Zeonex.

The norbornene-based addition (co)polymer is disclosed in JP-A Nos. 10-7732 and 2002-504184, US 2004/229157 A1, WO 2004/070463 A1, and the like. The norbornene-based addition (co)polymer is obtained through addition polymerization between norbornene-based cyclic unsaturated compounds. Optionally, a norbornene-based polycyclic unsaturated compound may be polymerized with ethylene, propylene, butene, conjugated diene (e.g., butadiene, isoprene, and the like), non-conjugated diene (e.g., ethylidene norbornene, and the like), or a linear diene compound (e.g., acrylonitrile, acrylic acid, methacrylic acid, maleic anhydride, an acrylic acid ester, a methacrylic acid ester, maleimide, vinyl acetate, vinyl chloride, and the like) through addition polymerization.

The norbornene-based addition (co)polymer is commercially available from Mitsui Chemicals, Inc. under the product name of APEL. Moreover, the norbornene-based addition (co)polymer is commercially available from POLYPLASTICS CO., LTD. under the product name of TOPAS.

The glass transition temperature (Tg) of the aliphatic cyclic polyolefin resin is preferably 140° C. or lower, more preferably 135° C. or lower, and even more preferably 120° C. or lower. Since the aliphatic cyclic polyolefin resin having a low Tg of 140° C. or lower, is used, the temperature-responsiveness of the porous polyurea particles each bearing the aluminum chelating compound (based on breakage of hydrogen bonds) is not impaired even when the porous polyurea particles are coated with the aliphatic cyclic polyolefin resin.

A deposition amount (coating amount) of the aliphatic cyclic polyolefin resin on the curing catalyst is not particularly limited, provided that curing at a temperature lower than curing temperatures known in the related art is realized and an effect of significantly improving storage stability of a one-part curable composition is obtained. The deposition amount may be appropriately selected in accordance with the intended purpose.

(Method of Producing Curing Agent)

The method of producing a curing agent according to the present invention includes dispersing, in a solution including an aliphatic cyclic polyolefin resin in an amount of 1% by mass or less and an organic solvent, porous polyurea particles each bearing an aluminum chelating compound or a water-insoluble catalyst powder having a solubility of 5% by mass or less relative to water, to thereby prepare a dispersion liquid, and spray-drying the dispersion liquid.

The amount of the aliphatic cyclic polyolefin resin in the organic solvent is 1% by mass or less, preferably 0.5% by mass or less, and more preferably 0.1% by mass or less. The lower limit of the amount of the aliphatic cyclic polyolefin resin is preferably 0.01% by mass or greater.

When the amount of the aliphatic cyclic polyolefin resin in the organic solvent is greater than 1% by mass, problems, such as thread-forming during spray drying and formation of coarse particles, may be caused.

The amount of the porous polyurea particles each bearing the aluminum chelating compound or the water-insoluble catalyst powder having a solubility of 5% by mass or less relative to water in the dispersion liquid is preferably 5% by mass or greater and 30% by mass or less.

For example, the organic solvent is preferably a solvent selected from chlorine-based solvents (e.g., dichloromethane, chloroform, and the like), C3-C12 chain hydrocarbons, C3-C12 cyclic hydrocarbons, C6-C12 aromatic hydrocarbons, esters, ketones, and ethers. The esters, ketones, and ethers may each include a cyclic structure.

Examples of the C3-C12 chain hydrocarbons include hexane, octane, isooctane, decane, and the like.

Examples of the C3-C12 cyclic hydrocarbons include cyclopentane, cyclohexane, derivatives of the foregoing hydrocarbons, and the like.

Examples of the C6-C12 aromatic hydrocarbons include benzene, toluene, xylene, and the like.

Examples of the esters include ethyl formate, propyl formate, pentyl formate, methyl acetate, ethyl acetate, pentyl acetate, and the like.

Examples of the ketones include acetones, methyl ethyl ketone, diethyl ketone, diisobutyl ketone, cyclopentanone, cyclohexanone, methylcyclohexanone, and the like.

Examples of the ethers include diisopropyl ether, dimethoxy methane, dimethoxy ethane, 1,4-dioxane, 1,3-dioxolane, tetrahydrofuran, anisole, phenetole, and the like.

The spray drying is not particularly limited, and may be carried out by any of spray dryers known in the related art.

The obtained curing agent is optionally washed with an organic solvent, coarsely crushed, dried, followed by crushing into primary particles using any of crushers known in the related art.

The organic solvent used for the washing is not particularly limited, and may be appropriately selected in accordance with the intended purpose. The organic solvent is preferably a nonpolar solvent. Examples of the nonpolar solvent include hydrocarbon-based solvents and the like. Examples of the hydrocarbon-based solvents include toluene, xylene, cyclohexane, and the like.

(Curable Composition)

The curable composition of the present invention includes the curing agent of the present invention and an epoxy resin, and preferably further includes a silanol compound. The curable composition may further include other components, as necessary.

<Curing Agent>

The curing agent included in the curable composition is the curing agent of the present invention.

The amount of the curing agent in the curable composition is not particularly limited, and may be appropriately selected in accordance with the intended purpose. The amount of the curing agent is preferably 1 part by mass or greater and 70 parts by mass or less, more preferably 1 part by mass or greater and 50 parts by mass or less, relative to 100 parts by mass of the epoxy resin. When the amount of the curing agent is less than 1 part by mass, curability of the curable composition may become low. When the amount of the curing agent is greater than 70 parts by mass, properties (e.g., flexibility, and the like) of the resin of the cured product may be impaired.

<Epoxy Resin>

The epoxy resin is not particularly limited, and may be appropriately selected in accordance with the intended purpose. Examples of the epoxy resin include alicyclic epoxy resins, glycidyl ether-based epoxy resins, glycidyl ester-based epoxy resins, solvent-containing epoxy resins prepared by dissolving any of the foregoing epoxy resins in a solvent, and the like.

The alicyclic epoxy resin is not particularly limited, and may be appropriately selected in accordance with the intended purpose. Examples of the alicyclic epoxy resin include vinyl cyclopentadiene dioxide, vinyl cyclohexene mono- or dioxide, dicyclopentadiene oxide, epoxy-[epoxy-oxaspiro $C_{8-15}$ alkyl]-cyclo $C_{5-12}$ alkane (e.g., 3,4-epoxy-1-[8,9-epoxy-2,4-dioxaspiro[5.5]undecan-3-yl]-cyclohexane, and the like), 3,4-epoxycyclohexylmethyl-3',4'-epoxycyclohexanecarboxylate, epoxy $C_{5-12}$ cycloalkyl $C_{1-3}$ alkyl-epoxy $C_{5-12}$ cycloalkane carboxylate (e.g., 4,5-epoxycyclooctylmethyl-4',5'-epoxycyclooctanecarboxylate, and the like), bis ($C_{1-3}$ alkyl-epoxy $C_{5-12}$ cycloalkyl $C_{1-3}$ alkyl) dicarboxylate (e.g., bis(2-methyl-3,4-epoxycyclohexylmethyl)adipate, and the like), and the like. The above-listed examples may be used alone or in combination.

As the alicyclic epoxy resin, 3,4-epoxycyclohexylmethyl-3',4'-epoxycyclohexanecarboxylate (product name: CELLOXIDE #2021P, manufactured by Daicel Corporation, epoxy equivalent: 128 to 140) is preferably used, because it is readily available as a commercial product.

In the list of the above examples, $C_{8-15}$, $C_{5-12}$, and $C_{1-3}$ represent the number of carbon atoms being 8 to 15, 5 to 12, and 1 to 3, respectively, and express the range of the structure of each compound.

The structural formula of one example of the alicyclic epoxy resin is represented below.

[Chem. 7]

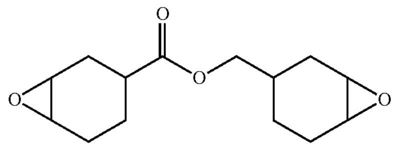

For example, the glycidyl ether-based epoxy resin or the glycidyl ester-based epoxy resin may be in the state of a liquid or a solid, and preferably has two or more epoxy groups per molecule where an epoxy equivalent weight is typically from approximately 100 to approximately 4,000. Examples of the glycidyl ether-based epoxy resin or the glycidyl ester-based epoxy resin include bisphenol A epoxy resins, bisphenol F epoxy resins, phenol novolac epoxy resins, cresol novolac epoxy resins, phthalic acid ester epoxy resin, and the like. The above-listed examples may be used alone or in combination. Among the above-listed examples, a bisphenol A epoxy resin is preferably used in view of resin properties. Moreover, the above-listed epoxy resins include monomers or oligomers.

<Silanol Compound>

Examples of the silanol compound include aryl silanol compounds.

For example, the aryl silanol compounds are represented by General Formula (A) below.

[Chem. 8]

$(Ar)_mSi(OH)_n$ General Formula (A)

In General Formula (A) above, m is 2 or 3, preferably 3, where a sum of m and n is 4; and Ar is an aryl group that may have a substituent.

The aryl silanol compounds represented by General Formula (A) are monools or diols.

Ar in General Formula (A) is an aryl group that may have a substituent.

Examples of the aryl group include a phenyl group, a naphthyl group (e.g., a 1-naphthyl group, a 2-naphthyl group, and the like), an anthracenyl group (e.g., a 1-anthracenyl group, a 2-anthracenyl group, a 9-anthracenyl group, a benz[a]-9-anthracenyl group, and the like), a phenaryl group (e.g., a 3-phenaryl group, a 9-phenaryl group, and the like), a pyrenyl group (e.g., a 1-pyrenyl group, and the like), an azulenyl group, a fluorenyl group, a biphenyl group (e.g., a 2-biphenyl group, a 3-biphenyl group, a 4-biphenyl group, and the like), a thienyl group, a furyl group, a pyrrolyl group, an imidazolyl group, a pyridyl group, and the like. The above-listed examples may be used alone or in combination. Among the above-listed examples, a phenyl group is preferred in view of ready availability and cost. A plurality of Ar in the number of m in total may be the same or different from one another, but are preferably the same in view of ready availability.

The above-listed aryl groups may have 1 to 3 substituents.

Examples of the substituents include electron-withdrawing groups, electron-donating groups, and the like.

Examples of the electron-withdrawing groups include halogen groups (e.g., chloro groups, bromo groups, and the like), trifluoromethyl groups, nitro groups, sulfo groups, carboxyl groups, alkoxycarbonyl groups (e.g., methoxycarbonyl groups, ethoxycarbonyl groups, and the like), formyl groups, and the like.

Examples of the electron-donating groups include alkyl groups (e.g., methyl groups, ethyl groups, propyl groups, and the like), alkoxy groups (e.g., methoxy groups, ethoxy group, and the like), hydroxy groups, amino groups, monoalkyl amino groups (e.g., monomethyl amino groups and the like), dialkyl amino groups (e.g., dimethyl amino groups and the like), and the like.

Specific examples of the phenyl group having a substituent include a 2-methylphenyl group, a 3-methylphenyl group, a 4-methylphenyl group, a 2,6-dimethylphenyl group, a 3,5-dimethylphenyl group, a 2,4-dimethylphenyl group, a 2,3-dimethylphenyl group, a 2,5-dimethylphenyl group, a 3,4-dimethylphenyl group, a 2,4,6-trimethylphenyl group, a 2-ethylphenyl group, a 4-ethylphenyl group, and the like.

When the electron-withdrawing group is used as a substituent, acidity of a hydroxyl group of a silanol group can be increased. When the electron-donating group is used as a substituent, acidity of a hydroxyl group of a silanol group can be decreased. Therefore, curing activity can be controlled with a substituent.

A plurality of Ar in the number of m in total may have mutually different substituents, but preferably have the same substituent in view of ready availability. Moreover, only some of Ar may have substituents, and the other Ar may not have substituents.

Among the above-listed examples, triphenyl silanol and diphenylsilane diol are preferred, and triphenyl silanol is particularly preferred.

<Other Components>

The above-mentioned other components are not particularly limited, and may be appropriately selected in accordance with the intended purpose. Examples of the above-mentioned other components include oxetane compounds, silane coupling agents, filler, pigments, antistatic agents, and the like.

<<Oxetane Compound>>

When the epoxy resin and the oxetane compound are used in combination in the curable composition, a sharp exothermic peak of the curable composition is obtained.

Examples of the oxetane compounds include 3-ethyl-3-hydroxymethyloxetane, 1,4-bis{[(3-ethyl-3-oxetanyl)methoxy]methyl}benzene, 4,4'-bis[(3-ethyl-3-oxetanyl)methoxymethyl]biphenyl, bis[(3-ethyl-3-oxetanyl)]methyl benzene-1,4-dicarboxylate, 3-ethyl-3-(phenoxymethyl)oxetane, 3-ethyl-3-(2-ethylhexyloxymethyl)oxetane, di[1-ethyl(3-oxetanyl)]methyl ether, 3-ethyl-3-{[3-(triethoxysilyl)propoxy]methyl}oxetane, oxetanyl silsesquioxane, phenol novolac oxetane, and the like. The above-listed examples may be used alone or in combination.

The amount of the oxetane compound in the curable composition is not particularly limited, and may be appropriately selected in accordance with the intended purpose. The amount of the oxetane compound is preferably 10 parts by mass or greater and 100 parts by mass or less, more preferably 20 parts by mass or greater and 70 parts by mass or less, relative to 100 parts by mass of the epoxy resin.

<<Silane Coupling Agent>>

As disclosed in the paragraphs [0007] to [0010] of JP-A No. 2002-212537, the silane coupling agent acts together with the aluminum chelating compound to initiate cationic polymerization of an epoxy resin. Therefore, an effect of accelerating curing of an epoxy resin is obtained by using a small amount of the silane coupling agent in combination with the aluminum chelating compound. A molecule of the silane coupling agent includes a C1-C3 lower alkoxy group, and may include a reactive group (e.g., a vinyl group, a styryl group, an acryloyloxy group, a methacryloyloxy group, an epoxy group, an amino group, a mercapto group, and the like). Since the curing agent of the present invention is a cationic curing agent, the coupling agent including an amino group or mercapto group is used when an amino group or mercapto group does not substantially capture generated cationic species.

Examples of the silane coupling agent include vinyl tris(1-methoxyethoxy)silane, vinyl triethoxy silane, vinyl trimethoxy silane, γ-styryltrimethoxysilane, γ-methacryloxypropyltrimethoxysilane, γ-acryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, and the like. The above-listed examples may be used alone or in combination.

The amount of the silane coupling agent in the curable composition is not particularly limited, and may be appropriately selected in accordance with the intended purpose. The amount of the silane coupling agent is preferably 1 part by mass or greater and 300 parts by mass or less, more preferably 1 part by mass or greater and 100 parts by mass or less, relative to 100 parts by mass of the curing agent.

Since the curable composition of the present invention can cure at a temperature lower than curing temperatures known in the related art, significantly improves storage stability of a one-part curable composition, and is highly convenient, the curable composition is suitably and widely used in various technical fields.

EXAMPLES

The present invention will be described below by way of Examples. The present invention should not be construed as being limited to these Examples.

Example 1

<Production of Curing Agent>

<<Porous Particle Production Step>>

—Preparation of Aqueous Phase—

A 3 L interfacial polycondensation container equipped with a thermometer was charged with 800 parts by mass of distilled water, 0.05 parts by mass of a surfactant (NEWREX R-T, manufactured by NOF CORPORATION), and 4 parts by mass of polyvinyl alcohol (PVA-205, manufactured by Kuraray Co., Ltd.) serving as a dispersant, and the resulting mixture was homogeneously mixed to prepare an aqueous phase.

—Preparation of Oil Phase—

Next, 100 parts by mass of a 24% by mass aluminum monoacetylacetonate bis(ethyl acetoacetate) isopropanol solution (Alumichelate D, manufactured by Kawaken Fine Chemicals Co., Ltd.), 70 parts by mass of a methylenediphenyl-4,4'-diisocyanate (3 mol) trimethylol propane (1 mol) adduct (polyfunctional isocyanate compound, D-109, manufactured by Mitsui Chemicals, Inc.), 30 parts by mass of divinyl benzene (manufactured by Merck KGaA, Darmstadt) serving as a radical polymerizable compound, and a radical polymerization initiator (PEROYL L, manufactured by NOF CORPORATION) in an amount that was 1% by mass equivalent weight (0.3 parts by mass) relative to the radical polymerizable compound were dissolved in 100 parts by mass of ethyl acetate to prepare an oil phase.

—Emulsification—

The prepared oil phase was added to the previously prepared aqueous phase, and the resulting mixture was mixed and emulsified by a homogenizer for 5 minutes at 10,000 rpm (T-50, manufactured by IKA Japan K.K.) to obtain an emulsion.

—Polymerization—

The prepared emulsion was reacted through interfacial polycondensation and radical polymerization for 6 hours at 80° C. After completing the reaction, the resulting polymerization reaction liquid was left to cool down to room temperature (25° C.). The generated polymer particles were separated from the polymerization reaction liquid by filtration, followed by natural drying at room temperature (25° C.) to obtain an aggregate curing agent. The obtained aggregate curing agent was were crushed into primary particles by a crusher (A-0 JET MILL, manufactured by SEISHIN ENTERPRISE CO., LTD.) to obtain a particulate curing agent.

—Highly-Loaded Impregnation Process with Aluminum Chelating Compound—

The obtained particulate curing agent (10.0 parts by mass) was added to an aluminum chelate-based solution [a solution obtained by dissolving 12.5 parts by mass of an aluminum chelating compound (Alumichelate D, manufactured by Kawaken Fine Chemicals Co., Ltd.) and 25.0 parts by mass of another aluminum chelating compound (ALCH-TR, manufactured by Kawaken Fine Chemicals Co., Ltd.) in 62.5 parts by mass of ethyl acetate], and the resulting mixture was stirred at a stirring speed of 200 rpm for 9 hours at 80° C. while evaporating the ethyl acetate.

After completing the stirring, the resulting mixture was filtered, and the separated solids were washed with cyclohexane to obtain an aggregate curing agent. The obtained aggregate curing agent was vacuum-dried for 4 hours at 30° C., followed by crushing into primary particles by a crusher (A-0 JET MILL, manufactured by SEISHIN ENTERPRISE CO., LTD.) to thereby obtain 11 parts by mass of a particulate curing agent (porous particles) subjected to the highly-loaded impregnation process with the aluminum chelating compound.

<Preparation of Spry Dry Process Liquid>

APL6509T (COC resin, manufactured by Mitsui Chemicals, Inc., glass transition temperature: 80° C.), which was an aliphatic cyclic polyolefin resin, was dissolved in cyclohexane to prepare a cyclohexane solution having an APL6509T concentration of 0.1% by mass (may be referred to as an "APL6509T solution" hereinafter). Thereafter, the particulate curing agent subjected to the highly-loaded impregnation process with the aluminum chelating compound was dispersed in the APL6509T solution by ultrasonic dispersion at the concentration of 10% by mass to thereby prepare a spray dry process liquid.

—Spray Drying Process—

The spray dry process liquid was spray-dried by a spray dryer (Mini-spray Dryer B-290, manufactured by Nihon BUCHI K.K.) to thereby obtain coarse particles of a curing agent. The inlet temperature of the dry room for the curing agent was set at 45° C. The obtained coarse particles of the curing agent were crushed into primary particles by a crusher (A-O JET MILL, manufactured by SEISHIN ENTERPRISE CO., LTD.) to thereby obtain a particulate curing agent. In the manner as described above, the curing agent of Example 1 was obtained.

Example 2

The curing agent of Example 2 was obtained in the same manner as in Example 1, except that, in <Preparation of spray dry process liquid>, the concentration of APL6509T was changed to 0.01% by mass.

Comparative Example 1

The curing agent of Comparative Example 1 was obtained in the same manner as in Example 1, except that the spray drying using the aliphatic cyclic polyolefin resin was not performed.

Comparative Example 2

The curing agent of Comparative Example 2 composed of porous particles surface-treated with a silane coupling agent was obtained in the same manner as in Example 1, expect that, instead of the addition of 100 parts by mass of triphenyl silanol (manufactured by Tokyo Chemical Industry Co., Ltd.) in <Preparation of oil phase> and the spray drying process, the following silane coupling agent surface treatment was performed.

—Silane Coupling Agent Surface Treatment—

In 30 parts by mass of cyclohexane, 240 parts by mass of an epoxy alkoxysilane coupling agent (KBM-303, manufactured by Shin-Etsu Chemical Co., Ltd.) was dissolved to prepare a silane coupling agent treatment liquid. To 300 parts by mass of the treatment liquid, 30 parts by mass of the particulate curing agent was added, and the resulting mixture was stirred at 200 rpm for 8 hours at 30° C. to perform a surface treatment with the silane coupling agent. After completing the reaction of the treatment, the resulting mixture was filtered, and the separated solids were washed with cyclohexane to obtain an aggregate curing agent. The obtained aggregate curing agent was vacuum-dried for 4 hours at 30° C., followed by crushing into primary particles by a crusher (A-C JET MILL, manufactured by SEISHIN ENTERPRISE CO., LTD.), to thereby obtain the curing agent.

Comparative Example 3

The curing agent of Comparative Example 3 composed of porous particles surface-treated with a cured product of an alicyclic epoxy resin was obtained in the same manner as in Example 1, except that, instead of the addition of 100 parts by mass of triphenyl silanol (manufactured by Tokyo Chemical Industry Co., Ltd.) in <Preparation of oil phase> and the spray drying process, the following coating process with a cured product of an alicyclic epoxy resin was performed.

—Coating Process with Cured Product of Alicyclic Epoxy Resin—

The particulate curing agent (25 parts by mass) was added to 300 parts by mass of a solution [a solution prepared by dissolving 180 parts by mass of an alicyclic epoxy resin (CEL2021P, manufactured by Daicel Corporation) in 120 parts by mass of cyclohexane], and the resulting mixture was stirred at 200 rpm for 20 hours at 30° C. During the stirring, the alicyclic epoxy resin was polymerized and cured on a surface of each of the porous particles. As a result, a coating film composed of the cured product of the alicyclic epoxy resin was formed on the surface of each porous particle.

After the stirring, the resulting mixture was filtered, and the separated solids were washed with cyclohexane to obtain an aggregate curing agent. The obtained aggregate curing agent was vacuum-dried for 4 hours at 30° C., followed by crushing into primary particles by a crusher (A-0 JET MILL, manufactured by SEISHIN ENTERPRISE CO., LTD.), to thereby obtain the curing agent.

<Particle Size Distribution>

A volume-based particle size distribution of each of the curing agents of Examples 1 to 2 and Comparative Example 1 was measured by MT3300EXII (laser diffraction/scattering, manufactured by MicrotracBEL Corp.). The results are presented in Table 1 and FIG. 1.

TABLE 1

| | APL6509T concentration (% by mass) | Volume-based mean particle diameter (μm) | Maximum volume-based particle diameter (μm) | CV (%) |
|---|---|---|---|---|
| Comp. Ex. 1 | — | 2.7 | 7.8 | 34.7 |
| Ex. 1 | 0.1 | 2.6 | 6.5 | 33.8 |
| Ex. 2 | 0.01 | 2.6 | 6.5 | 33.8 |

Since the process concentration of the COC resin was less than 1% by mass in Examples 1 and 2, formation of coarse particles was not observed from the results of Table 1 and FIG. 1.

<DSC Measurement>

Figure 2:
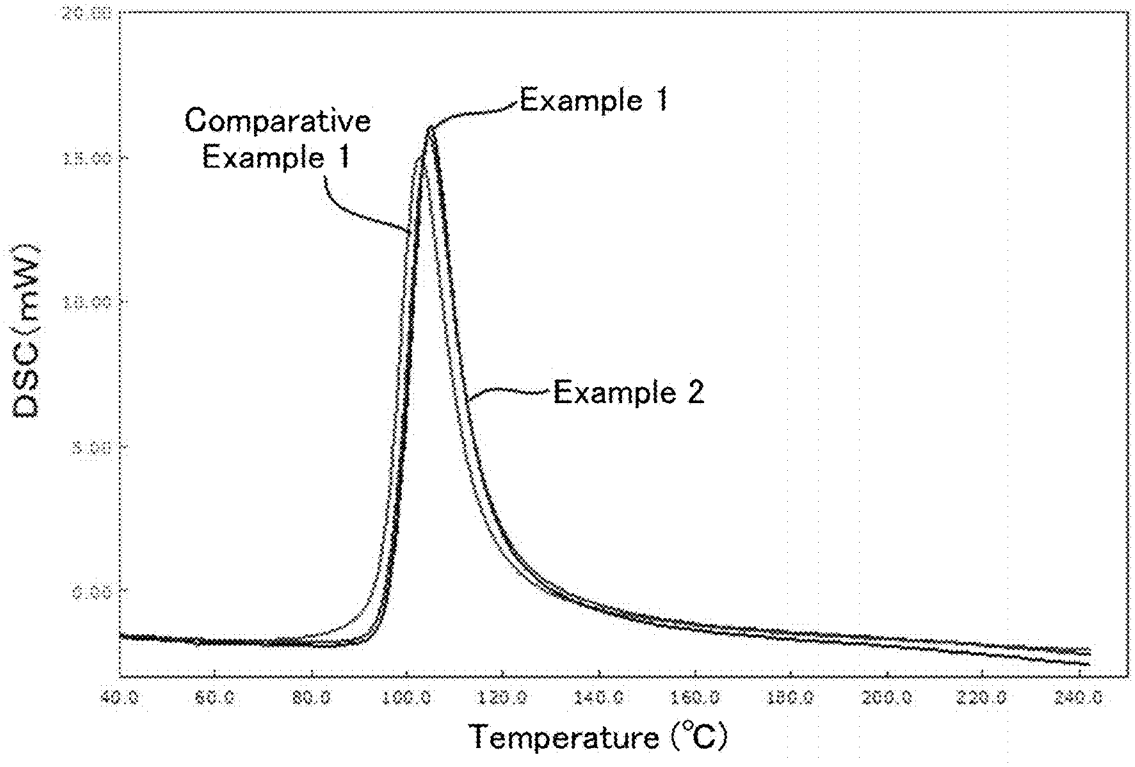
FIG. 2 is a chart depicting the DSC measurement results of the curing agents of Example 1, Example 2, and Comparative Example 1, respectively.

Next, each of the curing agents of Comparative Example 1 and Examples 1 and 2 was measured by DSC in the following manner. The results are presented in Table 2. Moreover, the DSC charts of Comparative Example 1 and Examples 1 and 2 are depicted in FIG. 2.

—Composition for DSC Measurement—

A composition prepared at a mass ratio of EP828:triphenyl silanol:curing agent=80:8:4 was used as a sample for a DSC measurement.

EP828 (bisphenol A epoxy resin, manufactured by Mitsubishi Chemical Corporation)

Triphenyl silanol (manufactured by Tokyo Chemical Industry Co., Ltd.)

Curing agent: the curing agents of Comparative Example 1, Example 1, and Example 2

—DSC Measuring Conditions—

Measuring device: DSC6200 (manufactured by Hitachi High-Tech Science Corporation)

Evaluation amount: 5 mg

Heating rate: 10° C./min

TABLE 2

| | APL6509T concentration (% by mass) | Exothermic onset temperature (° C.) | Exothermic peak temperature (° C.) | Total calorific value (J/g) |
|---|---|---|---|---|
| Comp. Ex. 1 | — | 75.8 | 102.6 | −402 |
| Ex. 1 | 0.1 | 88.4 | 104.9 | −422 |
| Ex. 2 | 0.01 | 87.8 | 104.5 | −423 |

According to the results in FIG. 2 and Table 2, the exothermic onset temperatures of the COC resin-processed products of Examples 1 and 2 were higher than the exothermic onset temperature of the unprocessed product of Comparative Example 1 by 10° C. or greater. Since the COC resin having a low glass transition temperature (Tg) was used in Examples 1 and 2, moreover, the exothermic peak temperatures of the processed products of Examples 1 and 2 were higher than that of the unprocessed product of Comparative Example 1 by less than 3° C.

<Storage Stability of One-Part Curable Composition>

Next, storage stability of a one-part curable composition based on a viscosity change of each of the curing agents of Comparative Example 1 and Examples 1 and 2 was evaluated in the following manner. The results are presented in Table 3. Moreover, the viscosity changes of Comparative Example 1 and Examples 1 and 2 are presented in FIG. 3.

—Composition for Measuring Storage Stability—

A composition prepared at a mass ratio of CEL2021P:KBM-403:triphenyl silanol:curing agent=100:0.5:7:2 was used as a sample for measuring storage stability.

CEL2021P (alicyclic epoxy resin, manufactured by Daicel Corporation)

KBM-403 (silane coupling agent, manufactured by Shin-Etsu Chemical Co., Ltd.)

Triphenyl silanol (manufactured by Tokyo Chemical Industry Co., Ltd.)

Curing agent: the curing agents of Comparative Example 1, Example 1, and Example 2

—Conditions for Storage Stability—

Storage temperature: 25° C.

Storage duration: 48 hours

Viscosity measurement: SV-10 (turning fork vibration viscometer, manufactured by A&D Company, Limited)

Viscosity measuring temperature: 20° C.

TABLE 3

| | APL6509T concentration (% by mass) | Initial (Pa · s) | 1 hour later (Pa · s) | 2 hours later (Pa · s) | 4 hours later (Pa · s) | 24 hours later (Pa · s) | 48 hours later (Pa · s) | 48 hours later viscosity increase rate (times) |
|---|---|---|---|---|---|---|---|---|
| Comp. Ex. 1 | Unprocessed | 3.61 | 5.18 | 6.32 | 11.82 | Exceeding measurable range | | — |
| Ex. 1 | 0.1 | 0.52 | 0.53 | 0.54 | 0.56 | 0.65 | 0.77 | 1.48 |
| Ex. 2 | 0.01 | 0.53 | 0.56 | 0.58 | 0.6 | 0.75 | 0.98 | 1.85 |

Figure 3:
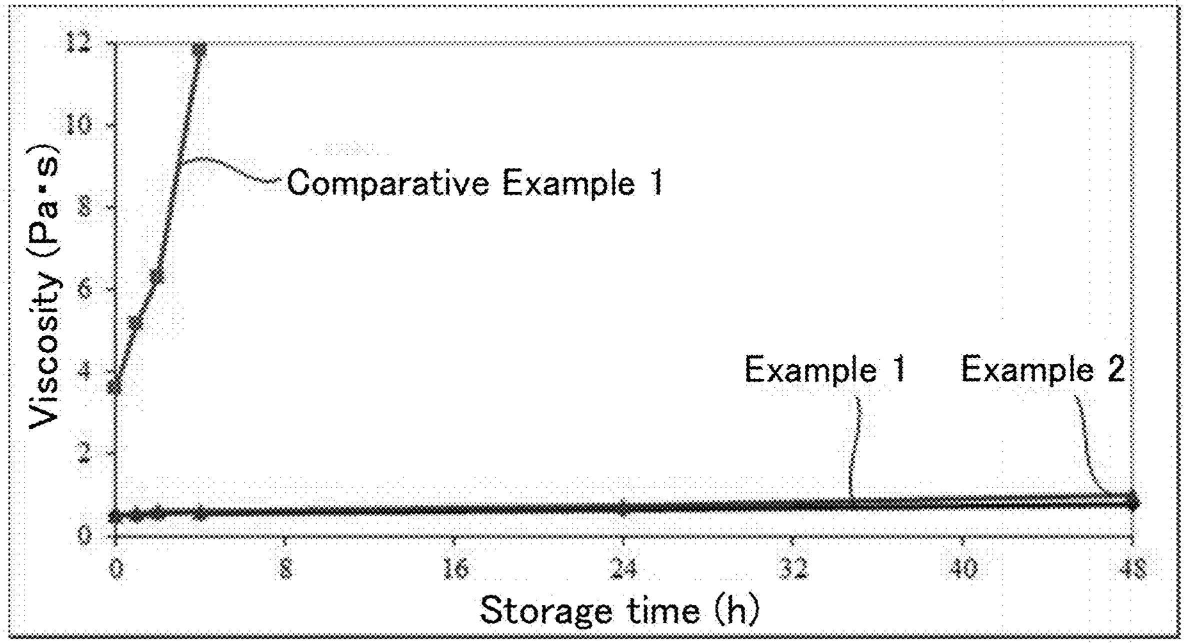
FIG. 3 is a graph depicting relationships between the storage time and viscosity of the curing agents of Example 1, Example 2, and Comparative Example 1, respectively.

It was confirmed from the results of Table 3 and FIG. 3 that the curing agents of Examples 1 and 2 which were processed with the COC resin exhibited excellent high-latency in the alicyclic epoxy resin having excellent cationic polymerization properties, compared to the unprocessed product of Comparative Example 1. Moreover, it was found that the viscosity increase rate after 48 hours was 2 times or less in Examples 1 and 2.

<Solvent Resistance Evaluation>

Figure 4:
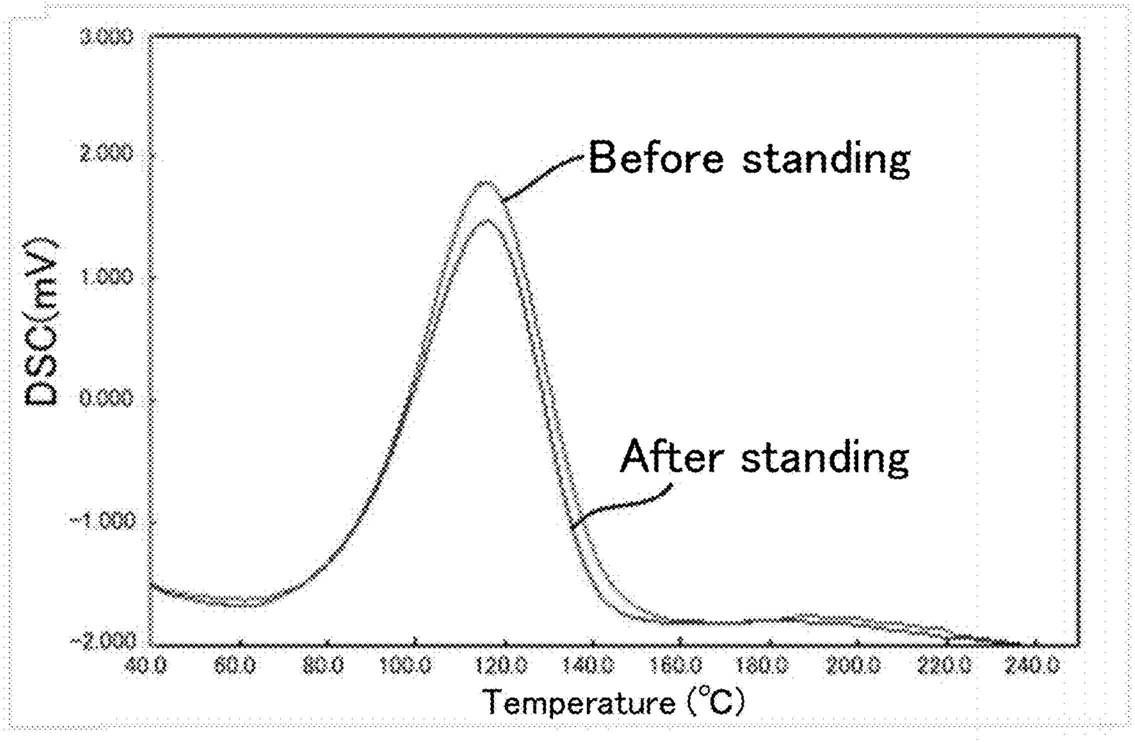
FIG. 4 is a chart depicting the DSC measurement results of the curing agent of Comparative Example 1 before and after the solvent resistance test.
Figure 5:
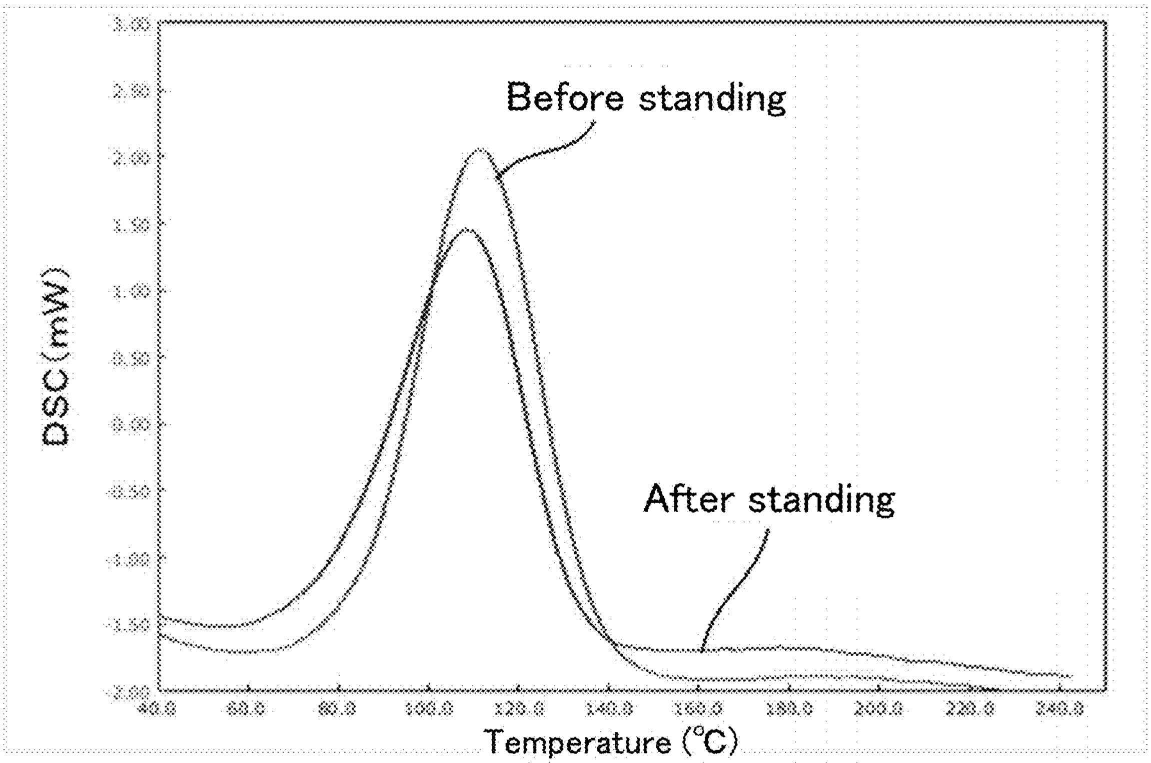
FIG. 5 is a chart depicting the DSC measurement results of the curing agent of Comparative Example 2 before and after the solvent resistance test.
Figure 6:
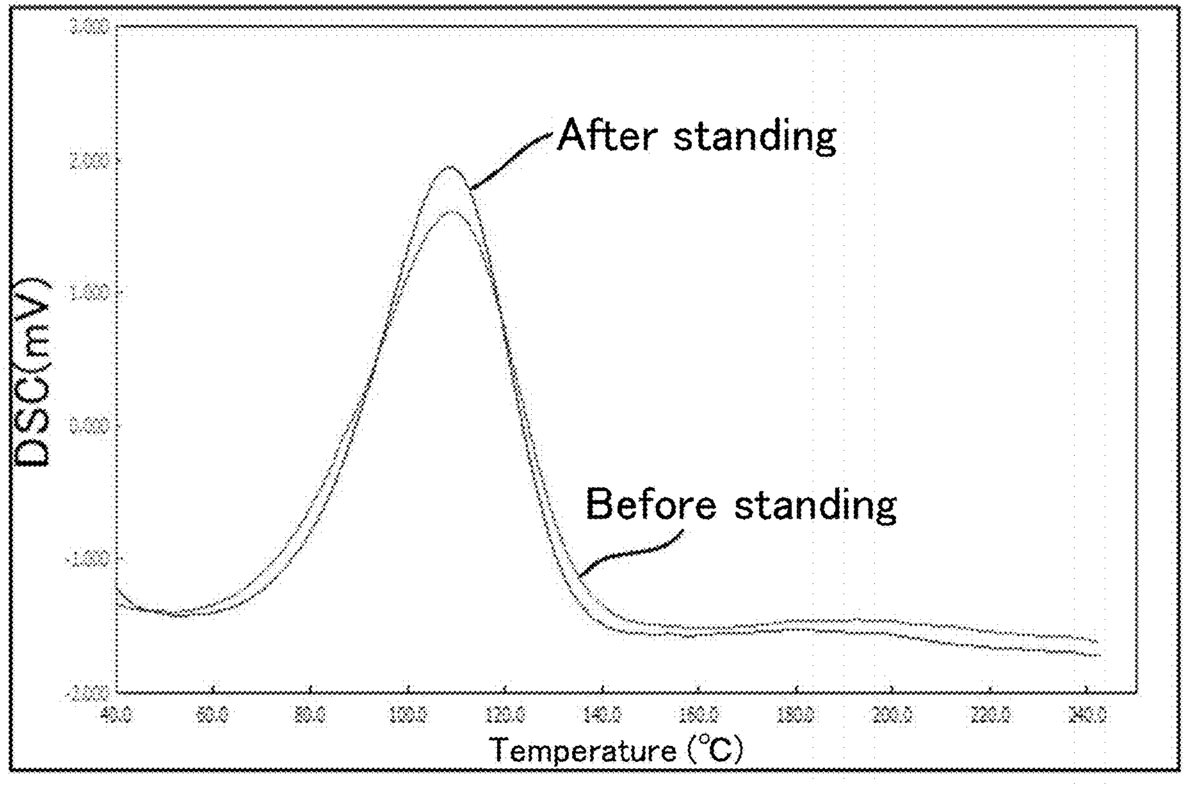
FIG. 6 is a chart depicting the DSC measurement results of the curing agent of Example 1 before and after the solvent resistance test.
Figure 7:
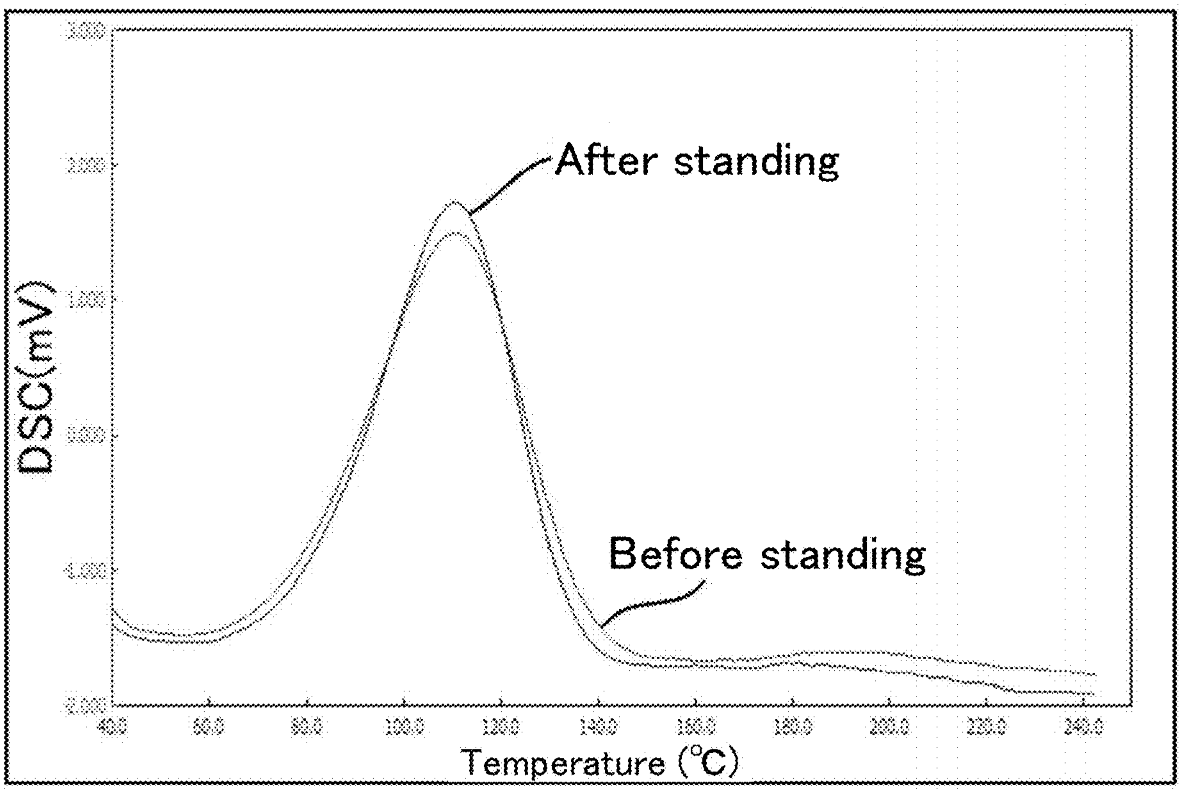
FIG. 7 is a chart depicting the DSC measurement results of the curing agent of Example 2 before and after the solvent resistance test.

Next, a solvent resistance evaluation was performed on each of the curing agents of Comparative Examples 1, 2, and 3, and Examples 1 and 2 in the following manner. The results are presented in Table 4. Moreover, FIG. 4 is a chart depicting the result of the DSC measurement of the curing agent of Comparative Example 1. FIG. 5 is a chart depicting the result of the DSC measurement of the curing agent of Comparative Example 2. FIG. 6 is a chart depicting the result of the DSC measurement of the curing agent of Example 1. FIG. 7 is a chart depicting the result of the DSC measurement of the curing agent of Example 2.

—Composition for Evaluating Solvent Resistance—

A composition prepared at a mass ratio of YP solution: YX8000:triphenyl silanol:curing agent=50:40:7:3 was used as a sample for evaluating solvent resistance.

YP70 (phenoxy resin, manufactured by NIPPON STEEL Chemical & Material Co., Ltd.)

YP70 solution (a solution prepared by dissolving YP70 in propylene glycol monomethyl ether acetate at a concentration of 45% by mass was used)

YX8000 (hydrogenated bisphenol A epoxy resin, manufactured by Mitsubishi Chemical Corporation)

Evaluation method: The composition just after the preparation (0 hours) and the composition left to stand for 4 hours at room temperature (25° C.) were each applied on a PET film by a bar coater to form a coating film having a thickness of 20 μm. Then, the applied coating film was dried for 5 minutes at 80° C. The dried film was evaluated by DSC.

Curing agent: the curing agents of Comparative Example 1, Comparative Example 2, Comparative Example 3, Example 1, and Example 2

—DSC Measurement Conditions—

Measuring device: DSC6200 (manufactured by Hitachi High-Tech Science Corporation)

Evaluation amount: 5 mg

Heating rate: 10° C./min

TABLE 4

| | Standing time after preparation (h) | Exothermic peak temperature (° C.) | Total calorific value (J/g) |
|---|---|---|---|
| Comp. Ex. 1 | 0 | 115.6 | −151 |
| | 4 | 116.0 | −136 |
| Comp. Ex. 2 | 0 | 111.2 | −156 |
| | 4 | 108.5 | −135 |
| Comp. Ex. 3 | 0 | Viscosity increased | Viscosity increased |
| | 4 | — | — |
| Ex. 1 | 0 | 109.0 | −142 |
| | 4 | 108.7 | −141 |
| Ex. 2 | 0 | 110.7 | −143 |
| | 4 | 110.4 | −142 |

It was confirmed from the results of Table 4 and FIGS. 4 to 7 that the DSC total calorific value did not decrease after standing for 4 hours at room temperature and excellent solvent resistance was observed in Examples 1 and 2, compared to Comparative Example 1 (the unprocessed product), Comparative Example 2 (the silane coupling agent surface treatment), Comparative Example 3 (coating with the cured product of the alicyclic epoxy resin).

<Surface Element Analysis by XPS>

A surface element analysis was performed on each of the curing agents Comparative Example 1 and Examples 1 and 2 by XPS under the following conditions. The results are presented in Table 5.

—XPS Measurement Conditions—

As a measuring device, XPS (PHI 5000 Versa Probe III, manufactured by ULVAC-PHI, INCORPORATED) was used. As an X-ray source, AlKα was used. As the measuring conditions, the current value was 34 mA, the acceleration voltage was 15 kV, and the scanning speed was 1 eV.

TABLE 5

| | APL6509T concentration (% by mass) | n | Atomic composition ratio (atom %) C | N | O | Al | [(C1 − C2)/C2] × 100 |
|---|---|---|---|---|---|---|---|
| Comp. Ex. 1 | unprocessed | 1 | 62.33 | 1.83 | 30.80 | 5.04 | — |
| | | 2 | 62.91 | 1.21 | 31.30 | 4.59 | |
| | | Average | 62.62 | 1.52 | 31.05 | 4.82 | |
| Ex. 1 | 0.1 | 1 | 68.96 | 1.63 | 25.79 | 3.61 | 10.0% |
| | | 2 | 68.80 | 0.69 | 26.65 | 3.86 | |
| | | Average | 68.88 | 1.16 | 26.22 | 3.74 | |
| Ex. 2 | 0.01 | 1 | 63.53 | 1.22 | 30.67 | 4.58 | 1.30% |
| | | 2 | 63.32 | 1.69 | 30.22 | 4.77 | |
| | | Average | 63.43 | 1.46 | 30.44 | 4.68 | |

It was confirmed from the results of Table 5 that the curing agents of Examples 1 and 2 had the higher carbon (C) content but the lower the aluminum (Al) content on the surface, compared to the unprocessed curing agent of Comparative Example 1. From the results as described, it was found that the aliphatic cyclic polyolefin resin (the COC resin) was present on the surface of the curing agent.

<Scanning Electron Microscopic (SEM) Observation>

Figure 8:
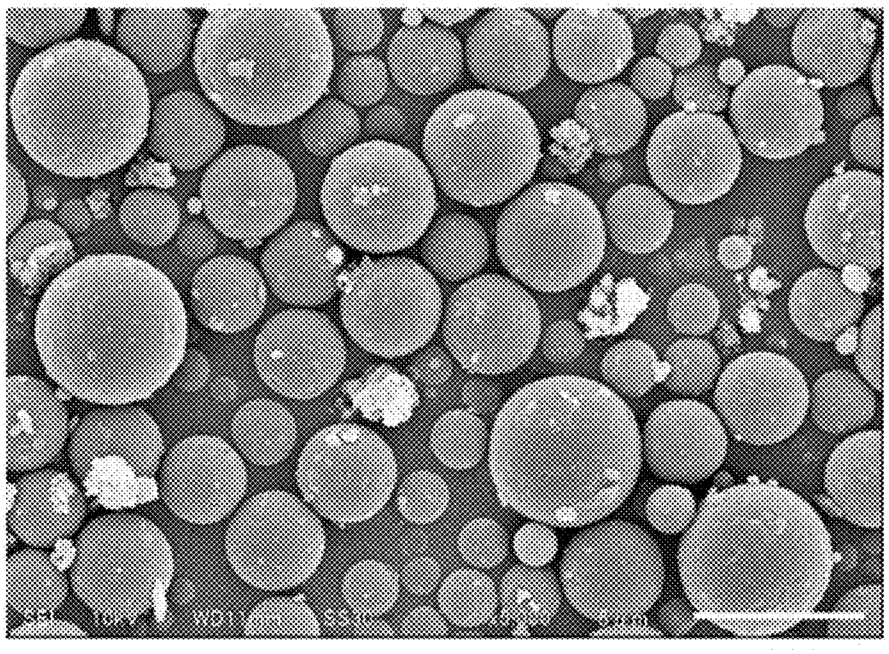
FIG. 8 is a SEM photograph (5,000×) of the curing agent of Comparative Example 1.
Figure 9:
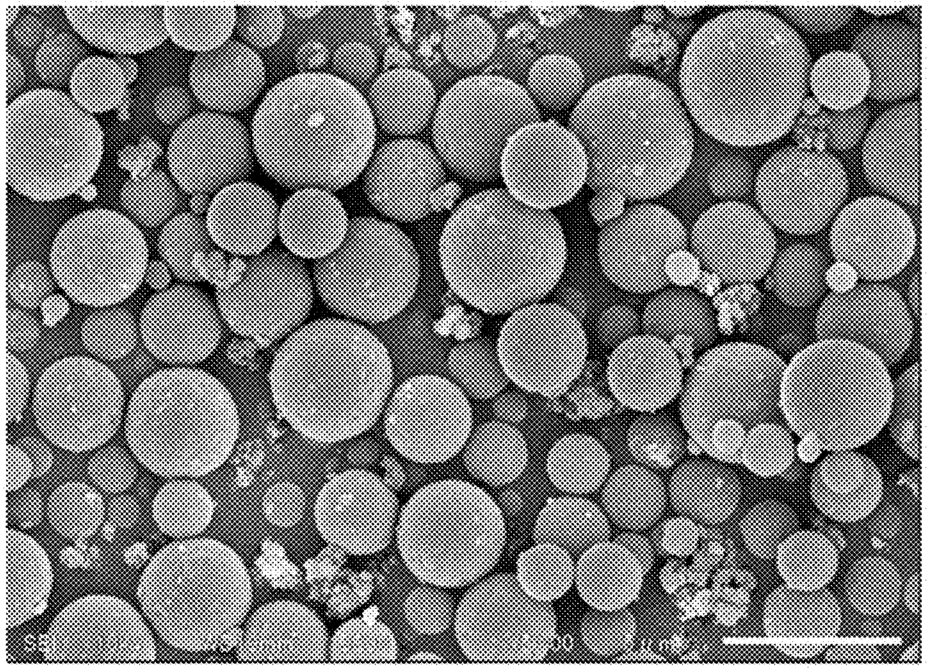
FIG. 9 is a SEM photograph (5,000×) of the curing agent of Example 1.
Figure 10:
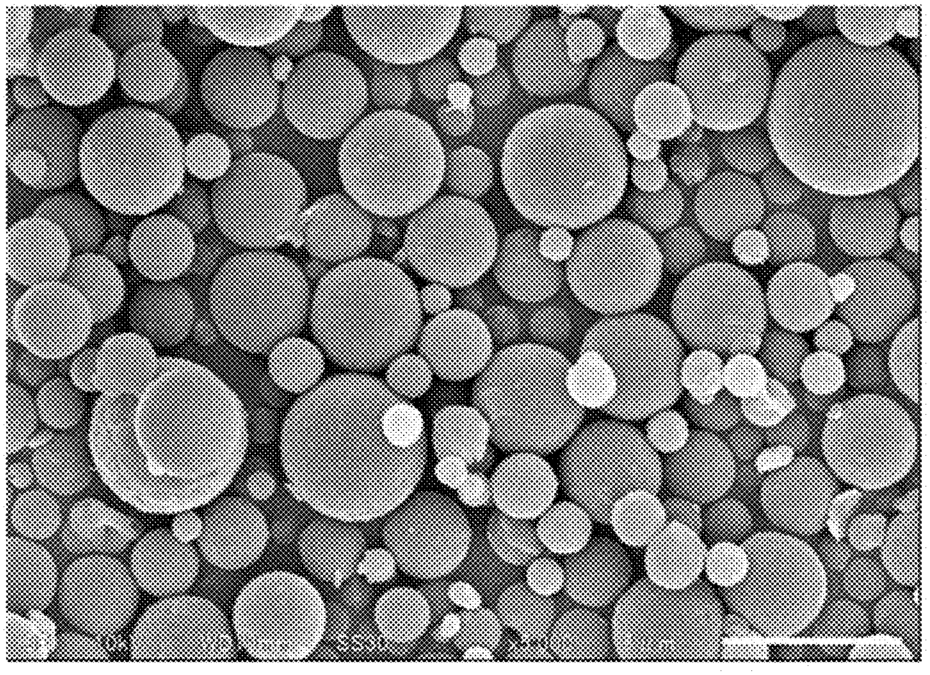
FIG. 10 is a SEM photograph (5,000×) of the curing agent of Example 2.

Next, SEM photographs of the curing agents of Comparative Example 1, and Examples 1 and 2 were taken by JSM-6510A (manufactured by JEOL Ltd.) and presented. FIG. 8 is a SEM photograph of the curing agent of Comparative Example 1 at the magnification of 5,000×. FIG. 9 is a SEM photograph of the curing agent of Example 1 at the magnification of 5,000×. FIG. 10 is a SEM photograph of the curing agent of Example 2 at the magnification of 5,000×.

Since the coating process with the COC resin at the low concentration was performed in Examples 1 and 2, formation of coarse particles or irregularly-shaped particles was not observed compared to the unprocessed curing agent of Comparative Example 1, according to the SEM photographs of FIGS. 8 to 10.

Example 3

The curing agent of Example 3 was obtained in the same manner as in Example 1, except that, in <Preparation of spray dry process liquid>, the COC resin (APL6509T) was replaced with a COP resin (ZNR1020, manufactured by Zeon Corporation, glass transition temperature Tg: 102° C.).

<DSC Measurement>

Next, the curing agent of Example 3 was measured by DSC in the same manner as in Example 1. The results are presented in Table 6. Moreover, DSC charts of Comparative Example 1 and Example 3 are presented in FIG. 11.

TABLE 6

| | ZNR1020R concentration (% by mass) | Exothermic onset temperature (° C.) | Exothermic peak temperature (° C.) | Total calorific value (J/g) |
|---|---|---|---|---|
| Comp. Ex. 1 | — | 75.8 | 102.6 | −402 |
| Ex. 3 | 0.1 | 86.5 | 105.5 | −385 |

Figure 11:
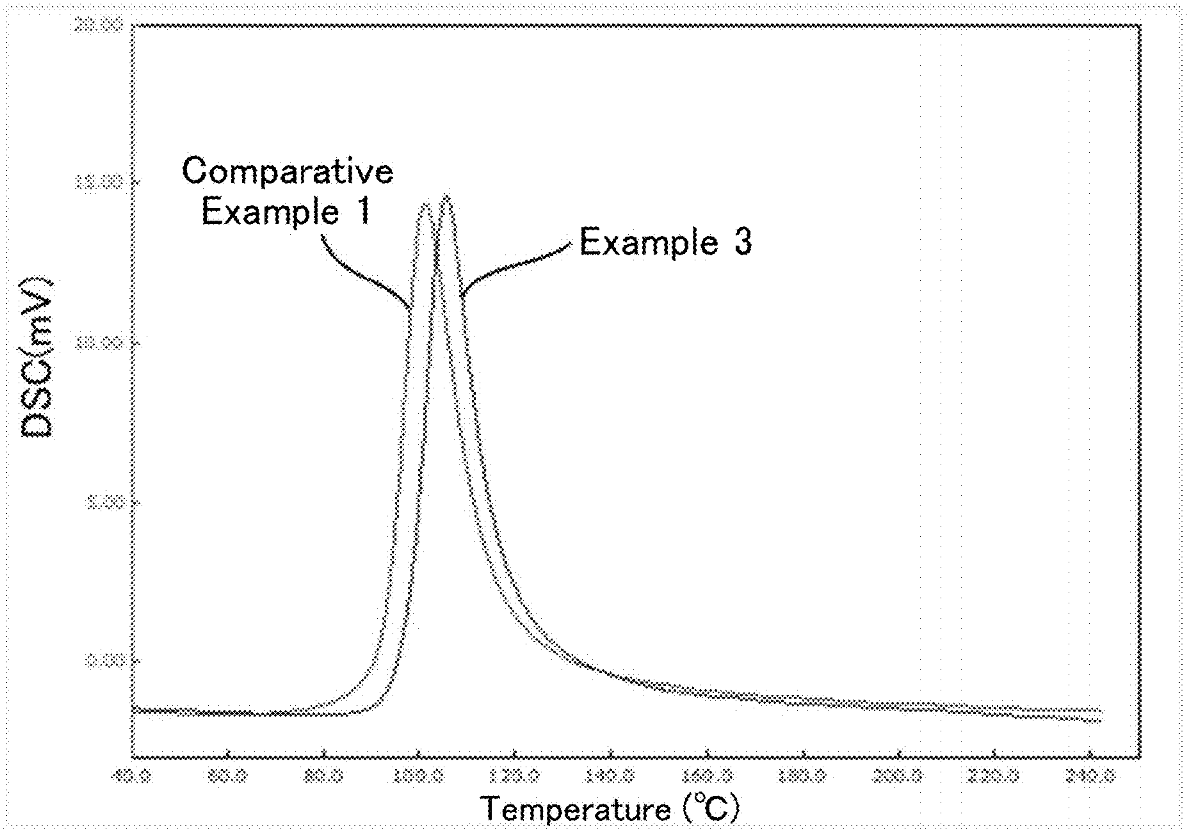
FIG. 11 is a chart depicting the DSC measurement results of the curing agents of Example 3 and Comparative Example 1, respectively.

According to Table 6 and FIG. 11 that a significant increase in the exothermic onset temperature was also confirmed with the curing agent processed with COP. Although the increase in the exothermic peak temperature was large compared to the increase observed with the curing agent processed with COC, the increase was less than 3VC. Therefore, it was consistent with Claim 9 and was not a problem (PT1-PT2≤5° C.).

<Storage Stability of One-Part Curable Composition>

Figure 12:
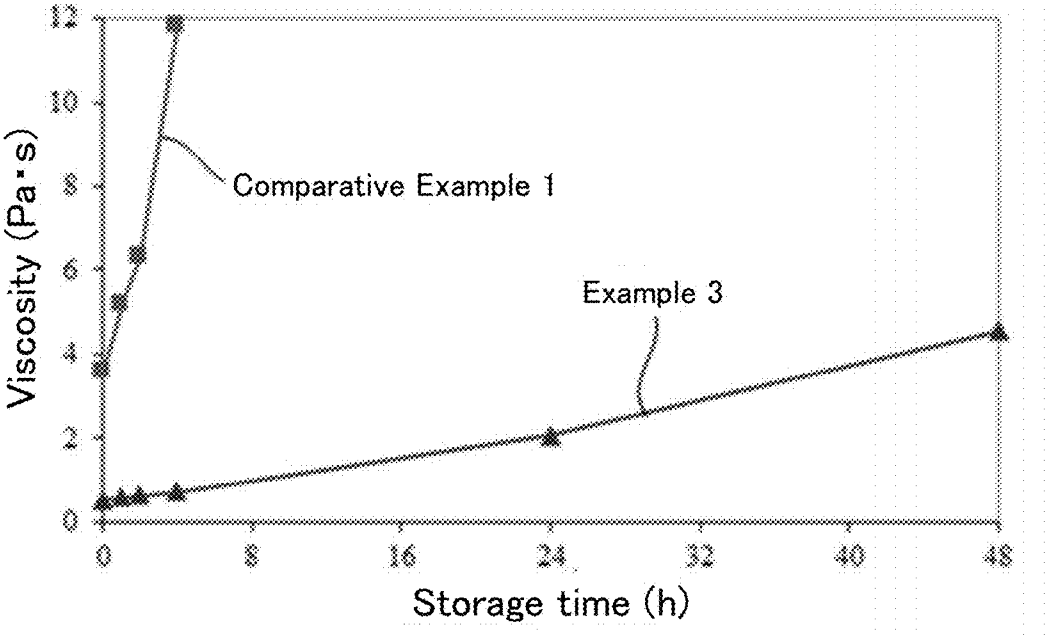
FIG. 12 is a graph depicting relationships between the storage time and viscosity of the curing agents of Example 3 and Comparative Example 1, respectively.

Next, storage stability of a one-part curable composition based on a viscosity change was evaluated on the curing agent of Example 3 in the same manner as in Example 1. The result is presented in Table 7. The viscosity changes of Comparative Example 1 an Example 3 are depicted in FIG. 12.

TABLE 7

| | ZNR1020R concentration (% by mass) | Initial (Pa · s) | 1 hour later (Pa · s) | 2 hours later (Pa · s) | 4 hours later (Pa · s) | 24 hours later (Pa · s) | 48 hours later (Pa · s) | 48 hours later viscosity increase rate (times) |
|---|---|---|---|---|---|---|---|---|
| Comp. Ex. 1 | Unprocessed | 3.61 | 5.18 | 6.32 | 11.82 | Exceeding measurable range | | — |
| Ex. 3 | 0.1 | 0.54 | 0.60 | 0.64 | 0.73 | 2.07 | 4.56 | 8.40 |

Example 4

—Water-Insoluble Catalyst Powder—

A curing agent of Example 4 was obtained in the same manner as in Example 1, except that the particulate curing agent (porous particles) subjected to the highly-loaded impregnation process with the aluminum chelating compound was replaced with a water-insoluble catalyst powder (an imidazole adduct, CUREDUCT P-0505, manufactured by SHIKOKU CHEMICALS CORPORATION) and the water-insoluble catalyst powder was processed with APL6509T at a concentration of 0.1% by mass.

Example 5

—Water-Insoluble Catalyst Powder—

A curing agent of Example 5 was obtained in the same manner as in Example 1, except that the particulate curing agent (porous particles) subjected to the highly-loaded impregnation process with the aluminum chelating compound was replaced with a water-insoluble catalyst powder (an aliphatic amine adduct, AJICURE MY-24, manufactured by Ajinomoto Fine-Techno Co., Inc.), and the water-insoluble catalyst powder was processed with APL6509T at a concentration of 0.1% by mass.

Comparative Example 4

A curing agent of Comparative Example 4 was obtained in the same manner as in Example 4, except that the spray drying using aliphatic cyclic polyolefin resin was not performed.

Comparative Example 5

A curing agent of Comparative Example 5 was obtained in the same manner as in Example 5, except that the spray drying using the aliphatic cyclic polyolefin resin was not performed.

<Water Solubility Test>

To 95 g of water of 25° C., 5 g of CUREDUCT P-0505 (an imidazole adduct, manufactured by SHIKOKU CHEMICALS CORPORATION) or AJICURE MY-24 (an aliphatic amine adduct, manufactured by Ajinomoto Fine-Techno Co., Inc.) was added. The resulting mixture was stirred for 24 hours by a stirrer. The resulting mixture was filtered with a filter having an average pore diameter of 0.1 μm. The resulting filtrate was measured by a thermogravimetry differential thermal analyzer (TG/DTA). Typically, the weight of P-0505 is reduced by 87.2%, and the weight of MY-24 is reduced by 74.5% in the high temperature region of 200° C. or higher. However, the reduction in the weights of both P-0505 and MY-24 was not observed.

Accordingly, it was confirmed that CUREDUCT P-0505 and AJICURE MY-24 were insoluble in water (solubility to water was 5% by mass or less).

Next, a volume-based particle size distribution of each of the curing agents of Example 4 and Comparative Example 4 (unprocessed product) was measured by MT3300EXII (laser diffraction/scattering, manufactured by MicrotracBEL Corp.). The results are presented in Table 8 and FIG. 13.

TABLE 8

| | APL6509T concentration (% by mass) | Volume-based mean particle diameter (μm) | Maximum volume-based particle diameter (μm) | CV (%) |
|---|---|---|---|---|
| Comp. Ex. 4 | — | 3.1 | 7.8 | 29.6 |
| Ex. 4 | 0.1 | 3.0 | 7.8 | 31.3 |

Figure 13:
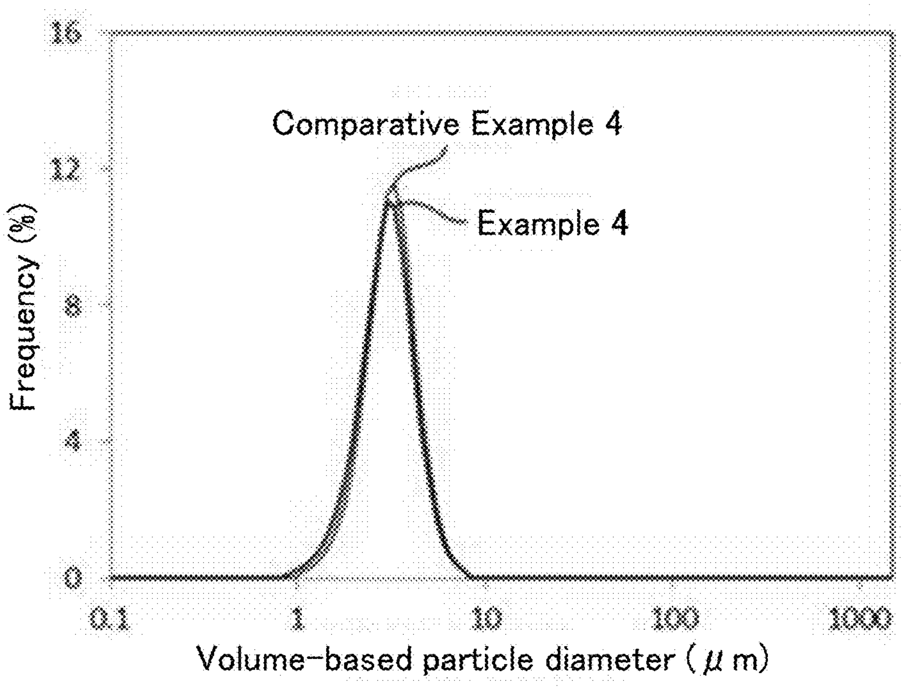
FIG. 13 is a graph depicting volume-based particle size distributions of the curing agents of Example 4 and Comparative Example 4, respectively.

According to the results of Table 8 and FIG. 13, formation of coarse particles due to the COC resin coating was not observed because the COC resin concentration of the processing liquid was low, i.e., less than 1% by mass, in Example 4.

<DSC Measurement>

Figure 14:
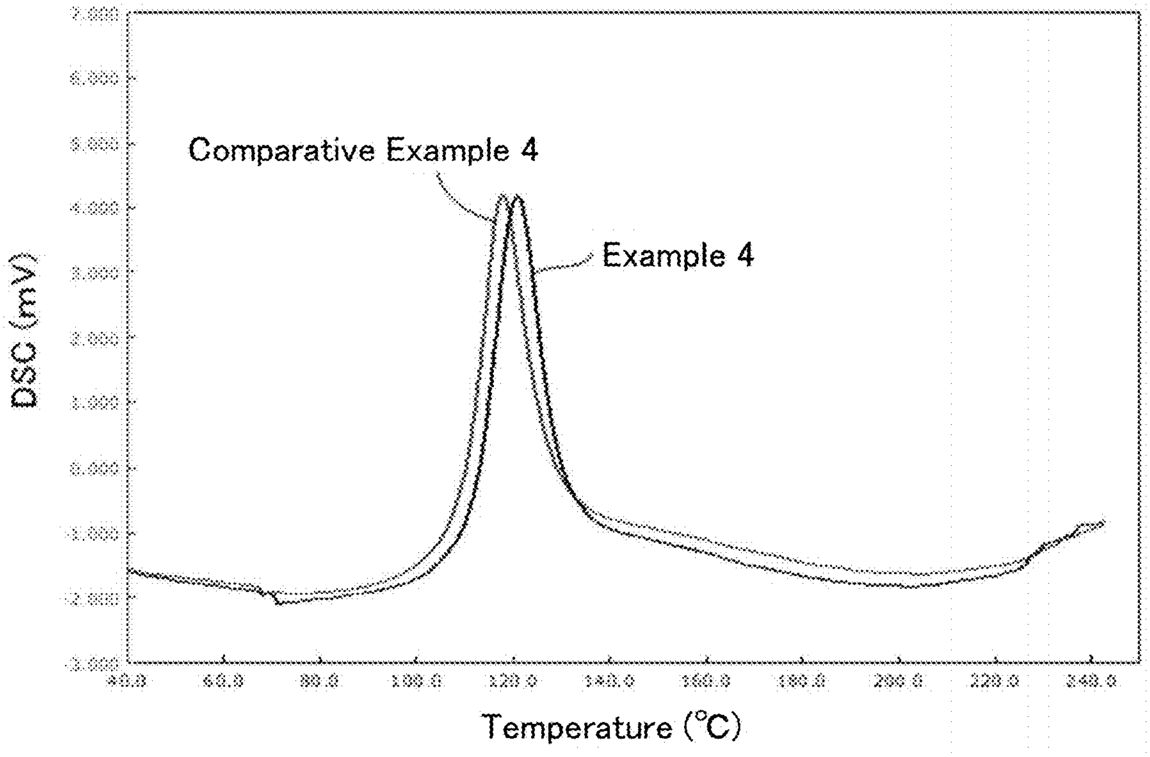
FIG. 14 is a chart depicting the DSC measurement results of the curing agents of Example 4 and Comparative Example 4, respectively.
Figure 15:
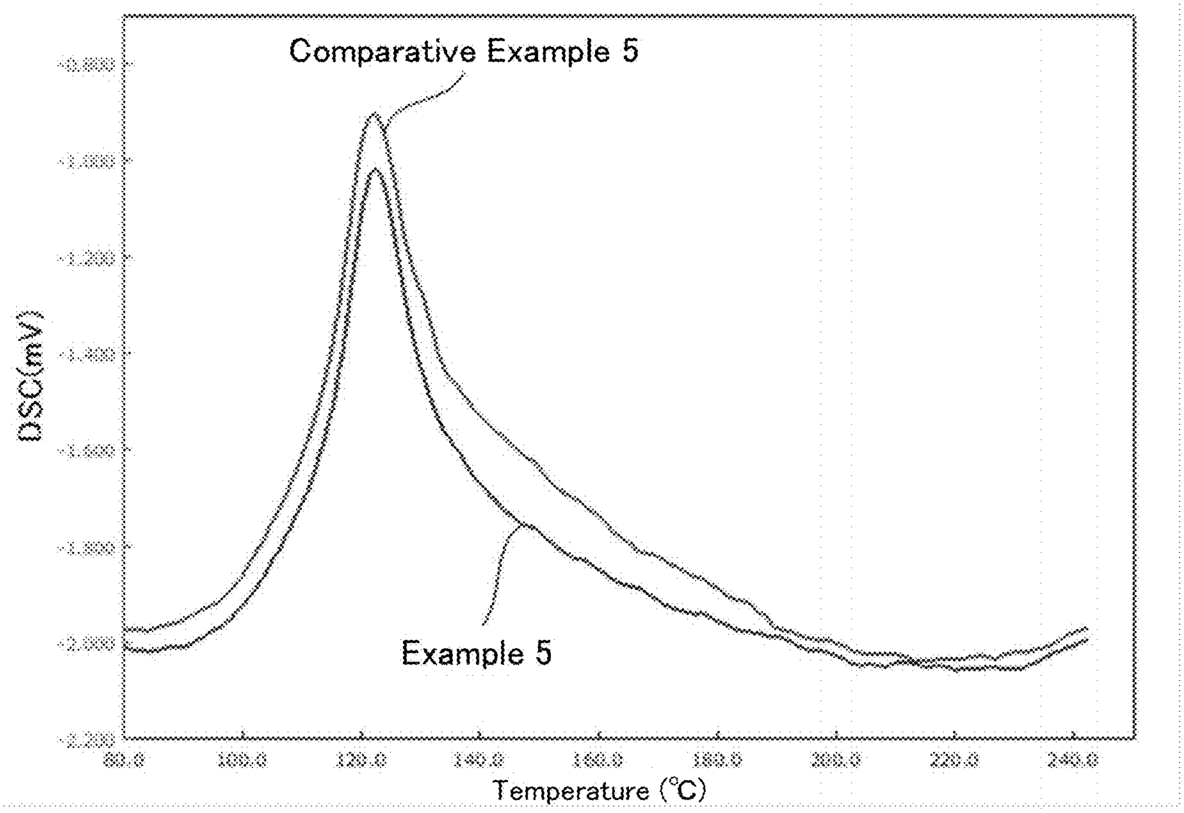
FIG. 15 is a chart depicting the DSC measurement results of the curing agents of Example 5 and Comparative Example 5, respectively.

Next, each of the curing agents of Comparative Example 4, Comparative Example 5, Example 4, and Example 5 was measured by DSC in the following manner. The results are presented in Table 9. Moreover, the DSC charts of Comparative Example 4 and Example 4 are depicted in FIG. 14, and the DSC charts of Comparative Example 5 and Example 5 are depicted in FIG. 15.

—Composition for DSC Measurement—

A composition prepared at a mass ratio of EP828:curing agent=72:8 was used as a sample for a DSC measurement.

EP828 (bisphenol A epoxy resin, manufactured by Mitsubishi Chemical Corporation)

Curing agent: the curing agents of Comparative Example 4, Comparative Example 5, Example 4, and Example 5

—DSC Measurement Conditions—

Measuring device: DSC6200 (manufactured by Hitachi High-Tech Science Corporation)

Evaluation amount: 5 mg

Heating rate: 10° C./min

TABLE 9

Figure 16:
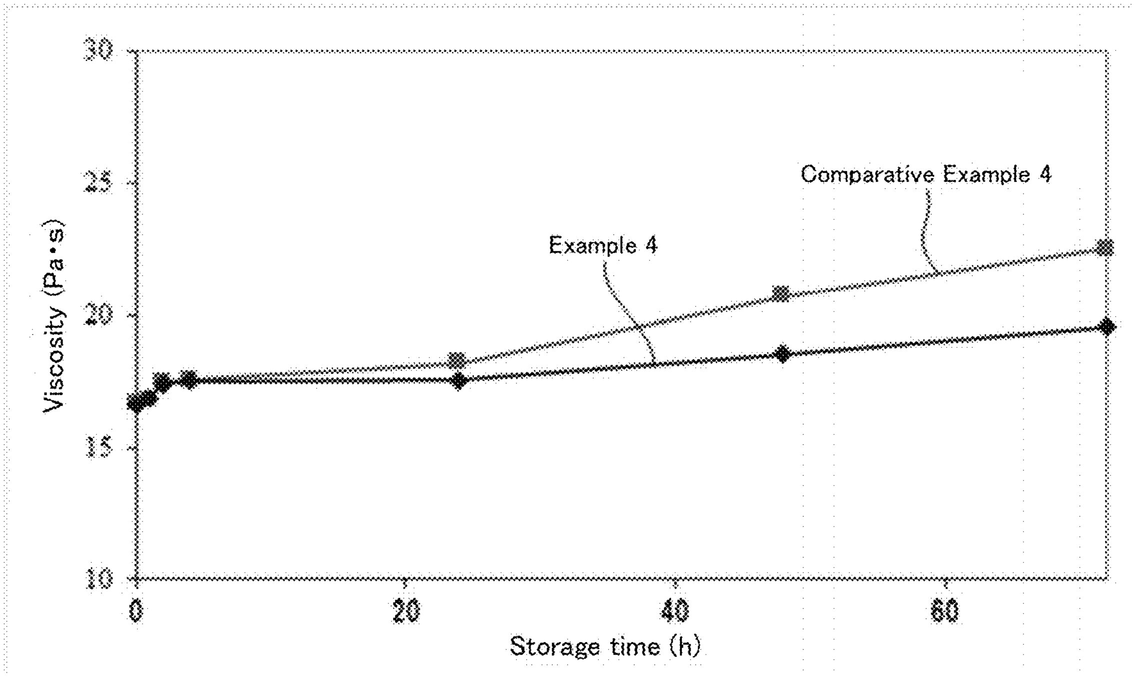
FIG. 16 is a graph depicting relationships between the storage time and viscosity of the curing agents of Example 4 and Comparative Example 4, respectively.
Figure 17:
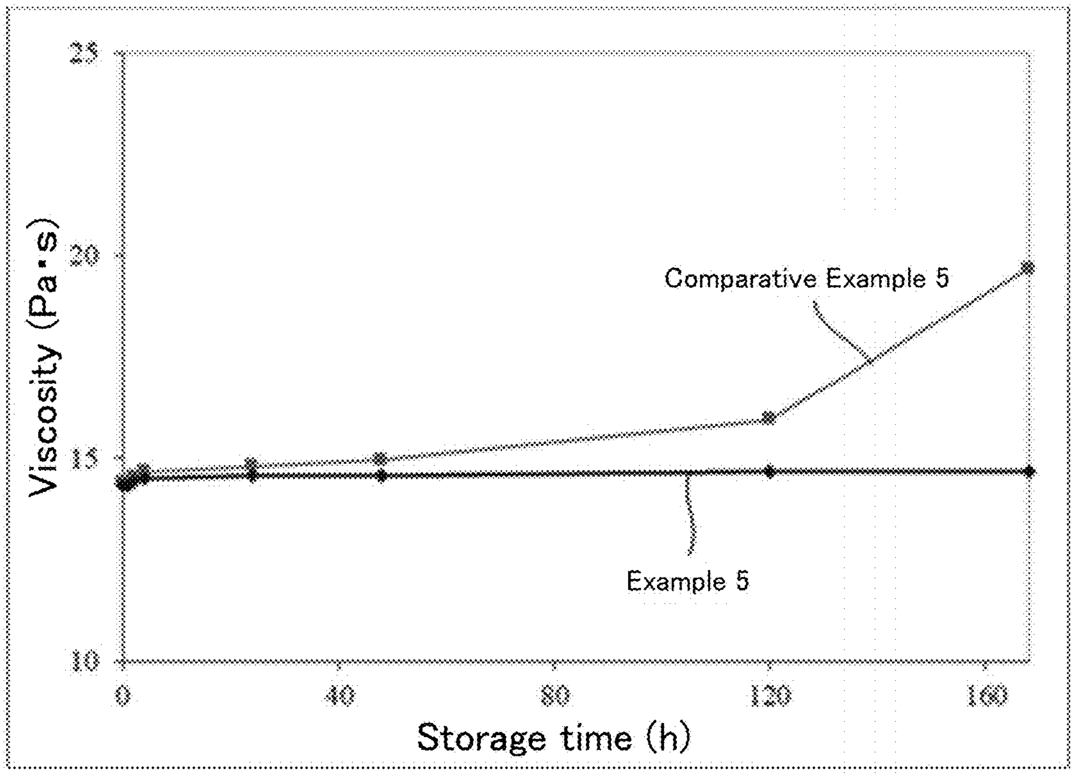
FIG. 17 is a graph depicting relationships between the storage time and viscosity of the curing agents of Example 5 and Comparative Example 5, respectively.

| | APL6509T concentration (% by mass) | Exothermic onset temperature (° C.) | Exothermic peak temperature (° C.) | Total calorific value (J/g) |
|---|---|---|---|---|
| Comp. Ex. 4 | — | 84.8 | 117.9 | −153 |
| Ex. 4 | 0.1 | 88.0 | 120.8 | −152 |
| Comp. Ex. 5 | — | 84.2 | 122.1 | −46 |
| Ex. 5 | 0.1 | 90.0 | 122.4 | −41 |

sition in the following manner. The results of Comparative Example 4 and Example 4 are presented in Table 10. The results of Comparative Example 5 and Example 5 are presented in Table 11. Moreover, the results of Comparative Example 4 and Example 4 are depicted in FIG. 16. The results of Comparative Example 5 and Example 5 are depicted in FIG. 17.

—Composition for Measuring Storage Stability—

A composition prepared at a mass ratio of EP828:curing agent=72:8 was used as a sample for a DSC measurement.

EP828 (bisphenol A epoxy resin, manufactured by Mitsubishi Chemical Corporation)

Curing agent: the curing agents of Comparative Example 4, Example 4, Comparative Example 5, and Example 5

—Conditions for Storage Stability—

Storage temperature: 30° C.

Storage duration: 72 hours (in Comparative Example 4 and Example 4), 168 hours (in Comparative Example 5 and Example 5) Viscosity measurement: SV-10 (turning fork vibration viscometer, manufactured by A&D Company, Limited)

Temperature for measuring viscosity: 20° C.

TABLE 10

| | APL6509T process concentration (% by mass) | Initial (Pa · s) | 1 hour later (Pa · s) | 2 hours later (Pa · s) | 4 hours later (Pa · s) | 24 hours later (Pa · s) | 48 hours later (Pa · s) | 72 hours later (Pa · s) | 72 hours later viscosity increase rate (times) |
|---|---|---|---|---|---|---|---|---|---|
| Comp. Ex. 4 | Unprocessed | 16.69 | 16.81 | 17.48 | 17.54 | 18.20 | 20.70 | 22.50 | 1.35 |
| Ex. 4 | 0.1 | 16.56 | 16.89 | 17.41 | 17.52 | 17.55 | 18.55 | 19.54 | 1.18 |

TABLE 11

| | APL6509T process concentration (% by mass) | Initial (Pa · s) | 2 hours later (Pa · s) | 4 hours later (Pa · s) | 24 hours later (Pa · s) | 48 hours later (Pa · s) | 120 hours later (Pa · s) | 168 hours later (Pa · s) | 168 hours later viscosity increase rate (times) |
|---|---|---|---|---|---|---|---|---|---|
| Comp. Ex. 5 | Unprocessed | 14.40 | 14.54 | 14.67 | 14.80 | 14.96 | 15.95 | 19.68 | 1.37 |
| Ex. 5 | 0.1 | 14.35 | 14.43 | 14.49 | 14.56 | 14.59 | 14.66 | 14.69 | 1.02 |

According to the results of Table 9 and FIGS. 14 and 15, the exothermic onset temperature of each of the curing agents of Examples 4 and 5 was increased owing to the COC resin coating process, compared to the unprocessed products of Comparative Examples 4 and 5, but the increased amount of the exothermic peak temperature was less than +3° C.

<Storage Stability of One-Part Curable Composition>

Next, the curable agents of Comparative Example 4, Example 4, Comparative Example 5, and Example 5 were evaluated on storage stability of a one-part curable composition in the following manner.

According to the results of Tables 10 and 11, and FIGS. 16 and 17, the viscosity increase rate of the curing agent of Example 4, which was processed with the COC resin, after 72 hours was less than 1.2 times even though the curing agent was stored at 30° C. Moreover, the viscosity increase rate of the curing agent of Example 5 after 168 hours was less than 1.1 times.

<Surface Element Analysis by XPS>

Next, a surface element analysis was performed on each of the curing agents of Comparative Examples 4 and 5, and Examples 4 and 5 by XPS under the following conditions. The results are presented in Table 12.

—XPS Measurement Conditions—

As a measuring device, XPS (PHI 5000 Versa Probe III, manufactured by ULVAC-PHI, INCORPORATED) was used. As an X-ray source, AlKα was used. As the measurement conditions, the current value was 34 mA, the acceleration voltage was 15 kV, and the scanning speed was 1 eV.

TABLE 12

| | APL6509T concentration (% by mass) | n | Atomic composition ratio (atom %) C | N | O | [(C1 − C2)/C2] × 100 |
|---|---|---|---|---|---|---|
| Comp. Ex. 4 | Unprocessed | 1 | 79.21 | 5.09 | 15.70 | — |
| | | 2 | 80.17 | 4.82 | 15.01 | |
| | | Average | 79.69 | 4.96 | 15.35 | |
| Ex. 4 | 0.1 | 1 | 80.73 | 4.62 | 14.65 | 1.3% |
| | | 2 | 80.64 | 4.65 | 14.71 | |
| | | Average | 80.69 | 4.63 | 14.68 | |
| Comp. Ex. 5 | Unprocessed | 1 | 77.53 | 2.93 | 19.54 | — |
| | | 2 | 78.58 | 2.73 | 18.69 | |
| | | Average | 78.06 | 2.83 | 19.11 | |
| Ex. 5 | 0.1 | 1 | 79.60 | 2.28 | 18.13 | 2.0% |
| | | 2 | 79.62 | 2.32 | 18.06 | |
| | | Average | 79.61 | 2.30 | 18.09 | |

It was confirmed from the results of Table 12 that the curing agents of Examples 4 and 5 had a higher carbon (C) content but a lower nitrogen (N) content, which was derived from imidazole or amine, on the surface, compared to the unprocessed curing agents of Comparative Examples 4 and 5. From the results as described, it was determined that the aliphatic cyclic polyolefin resin (the COC resin) was present on the surfaces of the curing agents of Examples 4 and 5.

<Method of Confirming Presence of Aliphatic Cyclic Polyolefin Resin on Surface of Curing Catalyst>

The presence of the aliphatic cyclic polyolefin resin on a surface of a curing catalyst was confirmed in the following manner.

Figure 18:
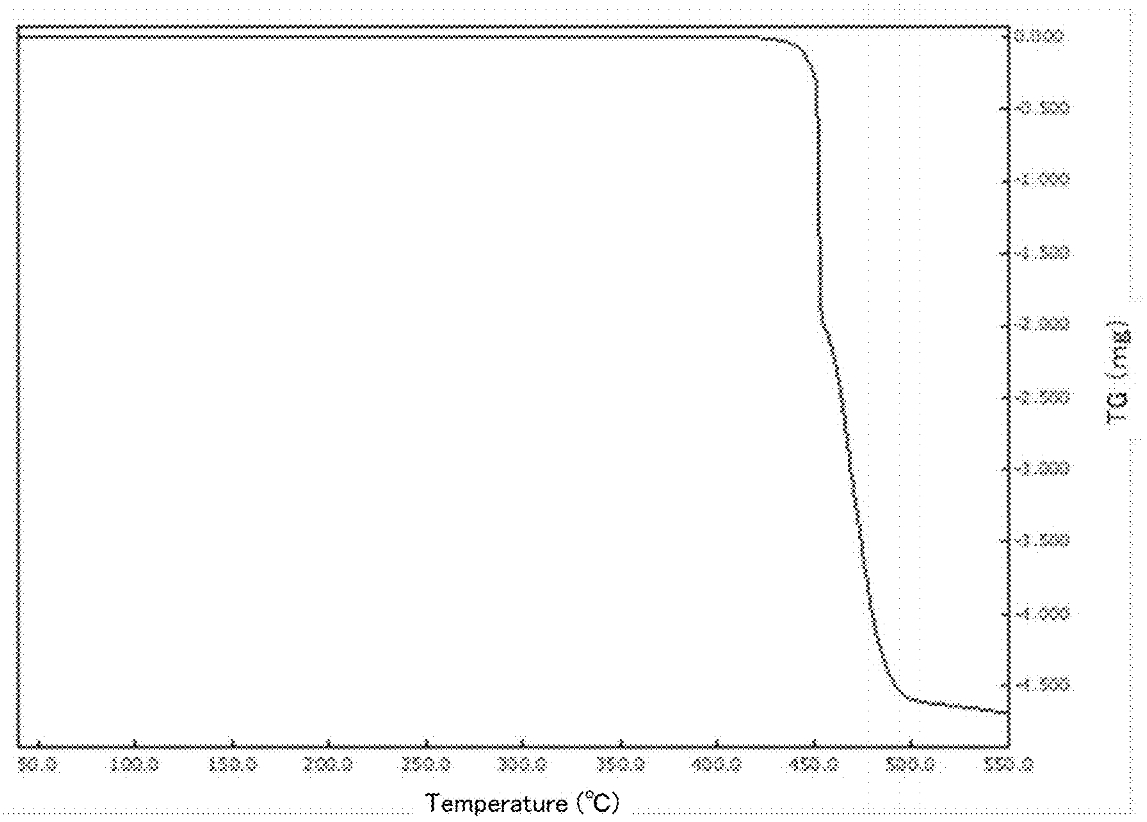
FIG. 18 is a chart depicting the TG measurement result of the COC resin (APL6509T).

First, a COC resin (APL6509T, manufactured by Mitsui Chemicals, Inc., glass transition temperature Tg: 80° C.) was measured by thermogravimetry (TG). The result is depicted in FIG. 18.

—TG Measurement Conditions—

TG/DTA6200 (manufactured by Hitachi High-Tech Science Corporation)

Heating rate: 10° C./min

Measuring weight: 5 mg

It was confirmed from the results of FIG. 18 that the weight of the COC resin (APL6509T) was decreased by approximately 92% between 400° C. and 500° C.

Figure 19:
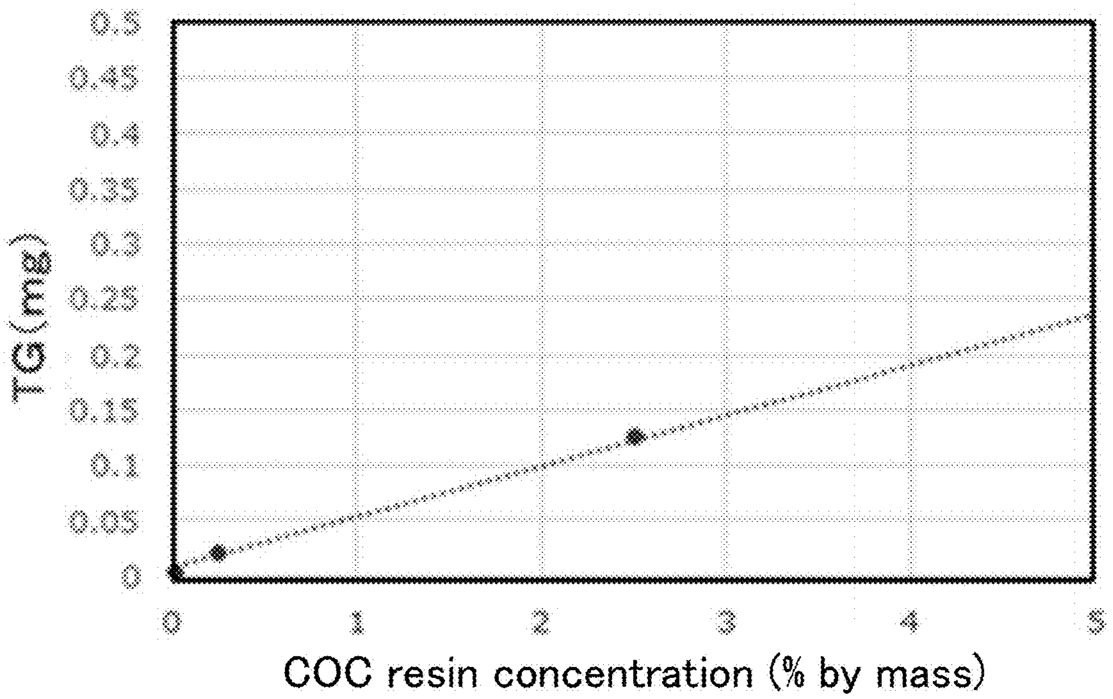
FIG. 19 is a graph depicting the correlation between the COC resin concentration and TG (mg).

A graph depicting the correlation between the COC resin concentration determined by applying the above-measured TG and the TG (mg) is depicted in FIG. 19. For the measurement, a solution prepared by dissolving the COC resin in chlorobenzene was used. For TG, the value of the weight reduction in the range of 400° C. to 500° C. was plotted.

<Determination of COC Amount in COC-Processed Curing Catalyst Particles>

A quantitative analysis of the COC resin in the curing agents of Examples 1 and 2 was performed based on the correlation graph of FIG. 19.

—Measuring Method—

The COC resin-processed curing catalyst (Examples 1 and 2) was dispersed in chlorobenzene to form a mixture having a concentration of 25% by mass, and the resulting mixture was stirred at 200 rpm for 7 days at room temperature to dissolve the COC resin. Then, the curing catalyst was removed from the solution by filtration with a filter having an average pore diameter of 0.45 μm, followed by measuring the COC resin concentration of the collected filtrate by TG/DTA. The COC resin concentration of the measured filtrate was calculated using the COC resin concentration-TG correlation graph. Thereafter, the ratio of the COC resin in the curing catalyst was calculated from the amount of the processed curing catalyst and the amount of the filtrate. The results are presented in Table 13.

TABLE 13

| | COC resin process concentration (% by mass) | TG* (mg) | COC resin concentration (% by mass) | COC resin ratio in catalyst (% by mass) |
|---|---|---|---|---|
| Ex. 1 | 0.1 | 0.004 | 0.087 | 0.26 |
| Ex. 2 | 0.01 | 0.001 | 0.021 | 0.06 |

*In Table 13, TG* (mg) denotes a value of the weight reduction between 400° C. and 500° C.

According to the results of Table 13, the COC resin ratio in the curing catalyst of Example 1 was 0.26% by mass, and the COC resin ratio in the curing catalyst of Example 2 was 0.06% by mass. Accordingly, it was confirmed that the surfaces of the curing catalyst particles were each coated with a thin film of the COC resin.

As described above, the curing agent obtained by coating a surface of a curing catalyst, which has either porous polyurea particles each bearing an aluminum chelating compound or a water-insoluble catalyst powder having a solubility of 5% by mass or less relative to water, with an aliphatic cyclic polyolefin resin could cure a composition at a temperature lower than curing temperatures known in the related art, and an epoxy resin composition whose storage stability in a state of a one-part curable composition was significantly improved could be obtained by adding the curing agent.

The invention claimed is:

1. A curing agent comprising:

a curing catalyst; and an aliphatic cyclic polyolefin resin disposed on a surface of the curing catalyst, wherein the curing catalyst includes porous polyurea particles each bearing an aluminum chelating compound, or a water-insoluble catalyst powder having a solubility of 5% by mass or less relative to water, and wherein the water-insoluble catalyst powder is an amine adduct compound.

2. The curing agent according to claim 1, wherein the water-insoluble catalyst powder includes a curable resin.

3. The curing agent according to claim 1, wherein the curing agent has a volume-based mean particle diameter of 10 μm or less.

4. The curing agent according to claim 1, wherein the amine adduct compound is an imidazole adduct or an aliphatic amine adduct.

5. The curing agent according to claim 1, wherein the aliphatic cyclic polyolefin resin has a glass transition temperature of 140° C. or lower.

6. The curing agent according to claim 1, wherein the aliphatic cyclic polyolefin resin is at least one of a cycloolefin copolymer (COC) and a cycloolefin homopolymer (COP).

7. A method of producing a curing agent, the method comprising:

dispersing, in a solution including an aliphatic cyclic polyolefin resin in an amount of 1% by mass or less and an organic solvent, porous polyurea particles each bearing an aluminum chelating compound or water-insoluble catalyst powder having a solubility of 5% by mass or less relative to water, to prepare a dispersion liquid, and spray-drying the dispersion liquid.

8. A curable composition comprising:

the curing agent according to claim 1; and an epoxy resin.

9. The curable composition according to claim 8, wherein the epoxy resin is at least one epoxy resin selected from the group consisting of an alicyclic epoxy resin, a glycidyl ether-based epoxy resin, a glycidyl ester-based epoxy resin, and a solvent-containing epoxy resin in which any of the glycidyl ether-based epoxy resin or the glycidyl ester-based epoxy resin is dissolved in a solvent.

10. The curable composition according to claim 8, further comprising:

a silanol compound.

* * * * *